US009686703B2

(12) United States Patent
Kim et al.

(10) Patent No.: US 9,686,703 B2
(45) Date of Patent: Jun. 20, 2017

(54) APPARATUS AND METHOD FOR TRANSMITTING AND RECEIVING CHANNEL STATE INFORMATION OF DOWNLINK CHANNEL IN MOBILE COMMUNICATION SYSTEM

(71) Applicant: Samsung Electronics Co., Ltd., Suwon-si, Gyeonggi-do (KR)

(72) Inventors: Young-Bum Kim, Seoul (KR); Youn-Sun Kim, Seongnam-si (KR); Hyo-Jin Lee, Seoul (KR); Joon-Young Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 115 days.

(21) Appl. No.: 14/053,966

(22) Filed: Oct. 15, 2013

(65) Prior Publication Data

US 2014/0105049 A1    Apr. 17, 2014

(30) Foreign Application Priority Data

Oct. 12, 2012 (KR) .................. 10-2012-0113632

(51) Int. Cl.
*H04W 24/10* (2009.01)
*H04W 76/04* (2009.01)
*H04L 5/00* (2006.01)

(52) U.S. Cl.
CPC ........... *H04W 24/10* (2013.01); *H04L 5/0057* (2013.01); *H04W 76/048* (2013.01); *H04L 5/0007* (2013.01); *H04L 5/0035* (2013.01)

(58) Field of Classification Search
None
See application file for complete search history.

(56) References Cited

U.S. PATENT DOCUMENTS

| | | | |
|---|---|---|---|
| 2009/0247223 A1 | 10/2009 | Yu et al. | |
| 2009/0310503 A1 | 12/2009 | Tenny et al. | |
| 2010/0098012 A1* | 4/2010 | Bala ................ | H04L 5/001 370/329 |
| 2010/0273506 A1 | 10/2010 | Stern-Berkowitz et al. | |

(Continued)

FOREIGN PATENT DOCUMENTS

| | | | | |
|---|---|---|---|---|
| KR | WO 2012091448 A2 * | 7/2012 | ......... | H04L 1/0028 |
| WO | 2011-150965 A1 | 12/2011 | | |

*Primary Examiner* — Hassan Phillips
*Assistant Examiner* — Ayanah George
(74) *Attorney, Agent, or Firm* — Jefferson IP Law, LLP

(57) ABSTRACT

A method for sending a Channel State Information (CSI) report for a Downlink (DL) channel by a User Equipment (UE) in a mobile communication system is provided. The method includes obtaining, from an evolved Node B (eNB), CSI report setting information including information about a transmission cycle and a transmission time for a CSI report, and Discontinuous Reception (DRX) setting information including information about an active time period in which signal transmission/reception is available in a DRX mode, determining whether the UE operates in the DRX mode, and if the UE is determined to operate in the DRX mode, adjusting the transmission time taking into account the CSI report setting information and the active time period, and sending the CSI report at the adjusted transmission time.

32 Claims, 14 Drawing Sheets

(56) References Cited

U.S. PATENT DOCUMENTS

| | | | |
|---|---|---|---|
| 2011/0216682 A1* | 9/2011 | Xu | H04L 1/0027 |
| | | | 370/311 |
| 2012/0076060 A1 | 3/2012 | Cai et al. | |
| 2012/0127869 A1* | 5/2012 | Yin | H04L 1/0031 |
| | | | 370/252 |
| 2012/0140649 A1* | 6/2012 | Choudhury | H04W 24/10 |
| | | | 370/252 |
| 2012/0207040 A1* | 8/2012 | Comsa | H04W 72/1215 |
| | | | 370/252 |
| 2013/0163527 A1 | 6/2013 | Luntilla et al. | |
| 2013/0279455 A1* | 10/2013 | Park | H04L 1/0028 |
| | | | 370/329 |

* cited by examiner

APPARATUS AND METHOD FOR TRANSMITTING AND RECEIVING CHANNEL STATE INFORMATION OF DOWNLINK CHANNEL IN MOBILE COMMUNICATION SYSTEM

CROSS-REFERENCE TO RELATED APPLICATION(S)

This application claims the benefit under 35 U.S.C. §119(a) of a Korean patent application filed on Oct. 12, 2012 in the Korean Intellectual Property Office and assigned Serial No. 10-2012-0113632, the entire disclosure of which is hereby incorporated by reference.

TECHNICAL FIELD

The present disclosure relates to an apparatus and method for transmitting and receiving Channel State Information (CSI) of a Downlink (DL) channel in a mobile communication system. More particularly, the present disclosure relates to an apparatus and method for transmitting and receiving a CSI report for a DL channel by a User Equipment (UE) operating in a Discontinuous Reception (DRX) mode in a mobile communication system supporting Coordinated Multi-Point operation (CoMP).

BACKGROUND

Mobile communication systems have evolved from the early communication systems for providing voice-oriented services, into high-speed, high-quality wireless packet data communication systems for providing data services and multi-media services. In recent years, a variety of mobile communication standards, such as High Speed Downlink Packet Access (HSDPA), High Speed Uplink Packet Access (HSUPA), Long Term Evolution (LTE) and Long Term Evolution Advanced (LTE-A) standards by 3rd Generation Partnership Project (3GPP), and High Rate Packet Data (HRPD) and Institute of Electrical and Electronics Engineers (IEEE) 802.16 standards by 3rd Generation Partnership Project 2 (3GPP2), have been developed to support the high-speed, high-quality wireless packet data services.

In particular, the LTE communication system, which is a system developed to efficiently support high-speed wireless packet data transmission, may maximize the system capacity by utilizing a variety of wireless access technologies. The LTE-A communication system, a wireless system that has evolved from the LTE communication system, may have higher wireless packet data transmission capability than the LTE communication system.

The existing $3^{rd}$ generation wireless packet data communication systems, such as HSDPA, HSUPA and HRPD, may use such technologies as Adaptive Modulation and Coding (AMC) and channel-sensitive scheduling to improve the transmission efficiency. In a communication system using AMC, a transmitter may adjust the amount of transmission data depending on the channel state. In other words, if the channel state is poor, the transmitter may adjust the receive error probability of a receiver to a desired level by decreasing the amount of transmission data. In contrast, if the channel state is good, the transmitter may increase the amount of transmission data, making effective transmission of a large amount of information while adjusting the receive error probability of the receiver to the desired level is possible.

In a communication system using channel-sensitive scheduling, a transmitter may selectively serve a user having a good channel state among multiple users, increasing the system capacity (e.g., the multi-user diversity gain), compared to when the communication system allocates a channel to a single user and serves the user. In brief, AMC and channel-sensitive scheduling may be the ways in which upon receiving channel state information (or feedback information) from a receiver, the transmitter may apply proper modulation scheme and coding scheme at the time which is determined as the most efficient time taking into account the channel state information.

Generally, the LTE and LTE-A communication systems may use Orthogonal Frequency Division Multiple Access (OFDMA), which allocates and operates time-frequency resources provided to separately carry data or control information for each user so that the data and/or control information for each user may not overlap each other, thereby making distinguishing of data or control information for each user possible. It is known that OFDMA can be expected to support higher system capacity than Code Division Multiple Access (CDMA) used in the existing $2^{rd}$ generation and $3^{rd}$ generation mobile communication systems. One of several reasons causing an increase in the system capacity in OFDMA may be that OFDMA can perform frequency domain scheduling. If channel-sensitive scheduling is used to obtain the capacity gain depending on the characteristics that channels vary over time, move capacity gain may be obtained by using the characteristics that channels are different depending on the frequency.

A cellular communication system having a plurality of cells may provide mobile communication services using the above-described several ways.

FIG. 1 illustrates architecture of a cellular communication system according to the related art.

Referring to FIG. 1, a cellular communication system 160 may be assumed to include a first cell 100, a second cell 110 and a third cell 120, at the center of each of which a central antenna is installed, and particularly, in the first cell 100 are located a first User Equipment (UE) 140 and a second UE 150.

A central antenna 130 installed at the center of the first cell 100 may provide a communication service to the first and second UEs 140 and 150, and the central antenna 130 may include one or multiple antennas. Because the second UE 150 is located closer to the central antenna 130 compared with the first UE 140, the central antenna 130 may support a higher data transfer rate to the second UE 150 than the first UE 140.

However, as illustrated in FIG. 1, transmit and receive antennas of each evolved Node B (eNB) are installed at the center of the cell in a concentrated way, and the antennas installed at the center of the cell may not support a high data transfer rate to the UEs located far away from the center of the cell.

The central antenna of each cell may transmit a Reference Signal (RS) or a pilot signal so that UEs may measure the channel state of a DL channel. Particularly, in the 3GPP LTE-A communication system, a CSI-RS may be defined as an example of the reference signal transmitted by an eNB, and a UE may measure the channel state between the UE itself and the eNB by receiving the CSI-RS from the eNB, configure a CSI report based on the measurement results, and feed the CSI report back to the eNB.

However, in some cases, the CSI report may not be sent depending on the operation mode of the UE, leading to the degradation of the system performance. Therefore, there is a need for a way to efficiently send a CSI report regardless of the operation mode of a UE.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for transmitting and receiving a Channel State Information (CSI) report for a Downlink (DL) channel in a mobile communication system.

Another aspect of the present disclosure is to provide an apparatus and method for transmitting and receiving a CSI report for a DL channel by a User Equipment (UE) operating in a Discontinuous Reception (DRX) mode in a mobile communication system supporting Coordinated Multi-Point operation (CoMP).

In accordance with an aspect of the present disclosure, a method for sending a CSI report for a DL channel by a UE in a mobile communication system is provided. The method includes obtaining, from an evolved Node B (eNB), CSI report setting information including information about a transmission cycle and a transmission time for a CSI report, and DRX setting information including information about an active time period in which signal transmission/reception is available in a DRX mode, determining whether the UE operates in the DRX mode, and if the UE is determined to operate in the DRX mode, adjusting the transmission time taking into account the CSI report setting information and the active time period, and sending the CSI report at the adjusted transmission time.

In accordance with another aspect of the present disclosure, a method for sending a CSI report for a DL channel by a UE in a mobile communication system is provided. The method includes obtaining, from an eNB, first CSI report setting information including information about a transmission cycle and a transmission time for a CSI report for a UE operating in a non-DRX mode, and second CSI report setting information including information about a transmission cycle and a transmission time for a CSI report for a UE operating in a DRX mode, and determining whether the UE operates in the DRX mode, and if the UE is determined to operate in the DRX mode, sending the CSI report at a transmission time, information about which is included in the second CSI report setting information.

In accordance with another aspect of the present disclosure, a method for receiving a CSI report for a DL channel by an eNB in a mobile communication system is provided. The method includes configuring CSI report setting information including information about a transmission cycle and a transmission time for a CSI report, and DRX setting information including information about an active time period in which signal transmission/reception is available in a DRX mode, transmitting the CSI report setting information and the DRX setting information to a UE, determining whether the UE operates in the DRX mode, and if the UE is determined to operate in the DRX mode, determining a reception time for a CSI report taking into account the CSI report setting information and the active time period, and receiving the CSI report at the determined reception time.

In accordance with another aspect of the present disclosure, a method for receiving a CSI report for a DL channel by an eNB in a mobile communication system is provided. The method includes configuring first CSI report setting information including information about a transmission cycle and a transmission time for a CSI report for a UE operating in a non-DRX mode, and second CSI report setting information including information about a transmission cycle and a transmission time for a CSI report for a UE operating in a DRX mode, and sending the configured information to the UE, and determining whether the UE operates in the DRX mode, and if the UE is determined to operate in the DRX mode, receiving the CSI report at a transmission time, information about which is included in the second CSI report setting information.

In accordance with another aspect of the present disclosure, a UE for sending a CSI report for a DL channel in a mobile communication system is provided. The UE includes a receiver configured to obtain, from an eNB, CSI report setting information including information about a transmission cycle and a transmission time for a CSI report, and DRX setting information including information about an active time period in which signal transmission/reception is available in a DRX mode, a CSI controller configured to determine whether the UE operates in the DRX mode, and if the UE is determined to operate in the DRX mode, to adjust the transmission time taking into account the CSI report setting information and the active time period, and a transmitter configured to send the CSI report at the adjusted transmission time.

In accordance with another aspect of the present disclosure, a UE for sending a CSI report for a DL channel in a mobile communication system is provided. The UE includes a receiver configured to obtain, from an eNB, first CSI report setting information including information about a transmission cycle and a transmission time for a CSI report for a UE operating in a non-DRX mode, and second CSI report setting information including information about a transmission cycle and a transmission time for a CSI report for a UE operating in a DRX mode, and a transmitter configured to determine whether the UE operates in the DRX mode, and to send, if the UE is determined to operate in the DRX mode, the CSI report at a transmission time, information about which is included in the second CSI report setting information.

In accordance with another aspect of the present disclosure, an eNB for receiving a CSI report for a DL channel in a mobile communication system is provided. The eNB includes a transmitter configured to configure CSI report setting information including information about a transmission cycle and a transmission time for a CSI report, and DRX setting information including information about an active time period in which signal transmission/reception is available in a DRX mode, and to transmit the CSI report setting information and the DRX setting information to a UE, a CSI controller configured to determine whether the UE operates in the DRX mode, and to determine, if the UE is determined to operate in the DRX mode, a reception time for a CSI report taking into account the CSI report setting information and the active time period, and a receiver configured to receive the CSI report at the determined reception time.

In accordance with another aspect of the present disclosure, an eNB for receiving a CSI report for a DL channel in a mobile communication system is provided. The eNB includes a transmitter configured to configure first CSI report setting information including information about a transmission cycle and a transmission time for a CSI report for a UE operating in a non-DRX mode, and second CSI report setting information including information about a transmission cycle and a transmission time for a CSI report for a UE operating in a DRX mode, and to send the configured information to the UE, and a receiver configured to determine whether the UE operates in the DRX mode, and to receive, if the UE operates in the DRX mode, the CSI report at a transmission time, information about which is included in the second CSI report setting information.

Other aspects, advantages, and salient features of the present disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
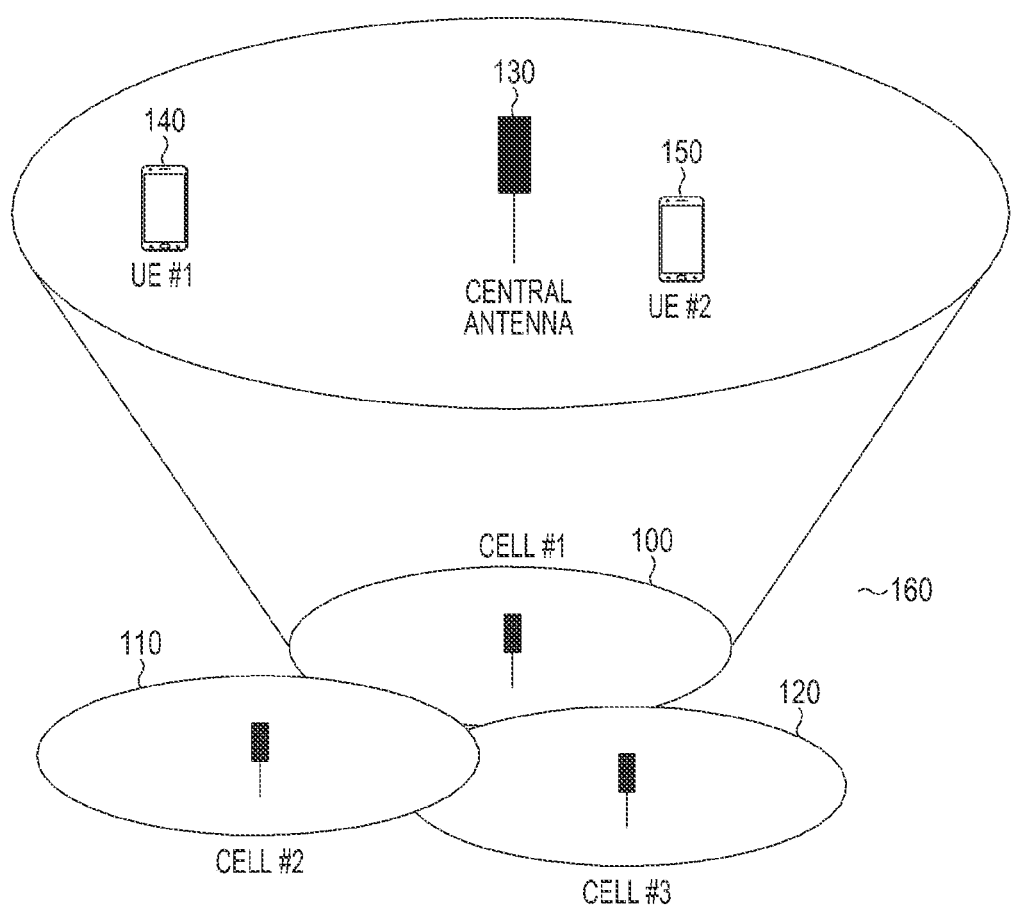
FIG. 1 illustrates architecture of a cellular communication system according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As a non-exhaustive illustration only, a User Equipment (UE) described herein may refer to mobile devices such as a cellular phone, a Personal Digital Assistant (PDA), a digital camera, a portable game console, an MP3 player, a Portable/Personal Multimedia Player (PMP), a handheld e-book, a tablet PC, a portable lap-top PC, a Global Positioning System (GPS) navigation, and devices such as a desktop PC, a high definition television (HDTV), an optical disc player, a set-top box, and the like capable of wireless communication or network communication consistent with that disclosed herein.

Although an apparatus and method for transmitting and receiving a Channel State Information (CSI) report in, for example, an Long Term Evolution Advanced (LTE-A) or Evolved Universal Terrestrial Radio Access (E-UTRA) communication system according to various embodiments of the present disclosure will be described herein below, it will be apparent to those of ordinary skill in the art that the CSI report transmission/reception apparatus and method proposed in the present disclosure may be applied to any other communication systems having the similar technical backgrounds and channel types, without departing from the scope and spirit of the disclosure.

Figure 2:
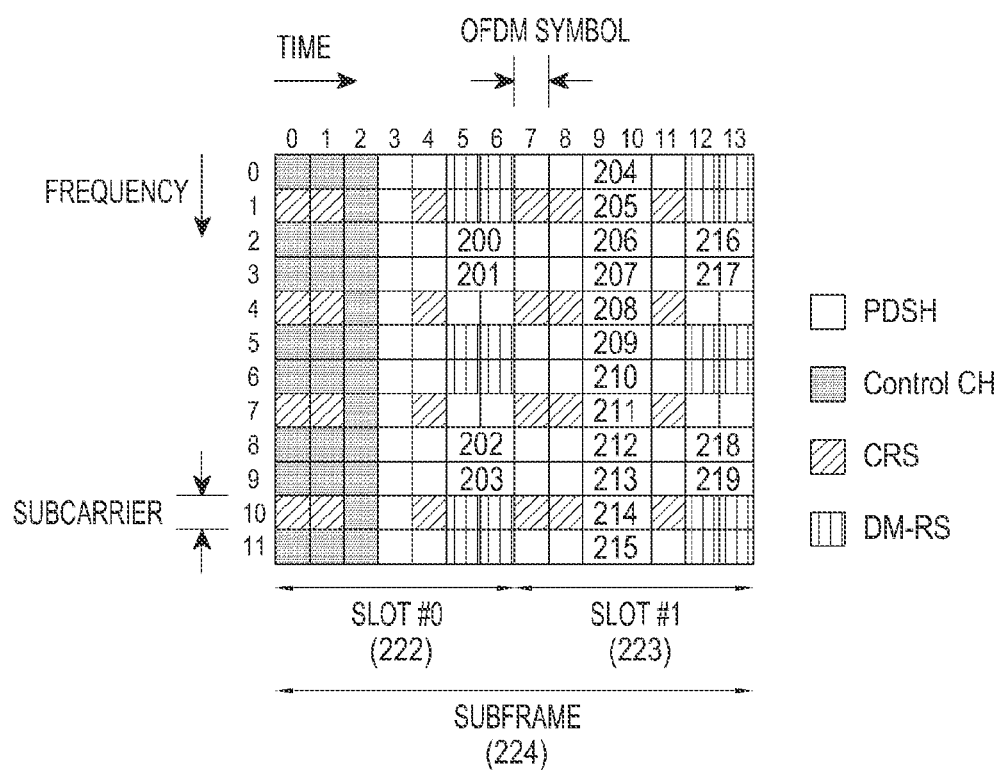
FIG. 2 illustrates positions at which Channel State Information Reference Signals (CSI-RSs) are transmitted in a physical resource structure for a Long Term Evolution Advanced (LTE-A) communication system according to an embodiment of the present disclosure.

FIG. 2 illustrates positions at which Channel State Information Reference Signals (CSI-RSs) are transmitted in a physical resource structure for an LTE-A communication system according to an embodiment of the present disclosure.

Referring to FIG. 2, in the illustrated physical resource structure, the horizontal axis represents the time domain, the vertical axis represents the frequency domain, an Orthogonal Frequency Division Multiple Access (OFDM) symbol represents the minimum transmission unit in the time domain, and a subcarrier represents the minimum transmission unit in the frequency domain. A subframe 224 may include a slot #0 222 and a slot #1 223, each of which is comprised of $N_{symbol}^{DL}$, for example, seven OFDM symbols, and the entire system bandwidth may include a total of $N_{BW}$ subcarriers. A value of $N_{BW}$ is proportional to the system bandwidth.

In the time-frequency domain, the basic unit of resources is a Resource Element (RE), and the RE may be defined using an OFDM symbol index and a subcarrier index. The minimum transmission unit for data or control information is a Resource Block (RB), and the RB may be defined by $N_{symbol}^{DL}$ consecutive OFDM symbols in the time domain and $N_{SC}^{RB}$ consecutive subcarriers in the frequency domain. Therefore, one RB may include $N_{symbol}^{DL} \times N_{SC}^{RB}$ REs.

A signal of a Downlink (DL) control channel may be transmitted over the first three OFDM symbols (e.g., OFDM symbols #0 to #2 of the slot #0 222) of the subframe 224. A signal of a Physical Downlink Shared Channel (PDSCH), a DL physical data channel, may be transmitted during the remaining subframe period (e.g., OFDM symbols #3 to #13) in which the DL control channel signal is not transmitted. Common Reference Signals (CRSs) and Demodulation Reference Signals (DM-RSs) may be transmitted at the positions which are distributed over the subframe 224 as illustrated in FIG. 2. The term 'DM-RS' as used herein may refer to a reference signal that a User Equipment (UE) may make reference to, when demodulating a PDSCH signal.

Among the reference signals transmitted by an evolved Node B (eNB), CSI-RSs may be transmitted at the positions corresponding to reference numerals 200 to 219. The CSI-RS is herein assumed to be an RS signal for two antenna ports, and in the physical resource structure, the areas corresponding to reference numerals 200 to 219, in which the CSI-RSs are transmitted, will be defined as CSI-RS resource areas. The CSI-RSs are defined to correspond to their own associated antenna ports. Therefore, upon receiving a CSI-RS, a UE may measure a channel state for the UE's antenna port. If the same CSI-RS is transmitted via two antenna ports, the UE may recognize the two antenna ports as one antenna port.

CSI-RSs may be used not only to measure the channel state, but also to measure an interference state, and the CSI-RSs used to measure the interference state will be referred to as zero-power CSI-RSs. In the physical resource structure, an area, to which a zero-power CSI-RS is mapped, will be defined as a CSI-Interference Measurement (CSI-IM) resource area, and the CSI-IM resource areas correspond to some of the CSI-RS resource areas. In other words, an eNB may transmit no signal by mapping zero-power CSI-RSs to CSI-IM resource areas, allowing a UE to measure interferences from surrounding cells during the period occupied by the CSI-IM resource areas.

CSI-RS resource areas are allocated to cells on a one-to-one basis, so CSI-RSs transmitted from different cells may be transmitted at different positions of the physical resource structure. For example, a CSI-RS transmitted from the first cell 100 illustrated in FIG. 1 may be allocated an associated CSI-RS resource area so as to be transmitted in the area corresponding to reference numeral 200, a CSI-RS transmitted from the second cell 110 may be allocated an associated CSI-RS resource area so as to be transmitted in the area corresponding to reference numeral 205, and a CSI-RS transmitted from the third cell 120 may be allocated an associated CSI-RS resource area so as to be transmitted in the area corresponding to reference numeral 210. In this way, by allocating the CSI-RS resource areas so that CSI-RSs transmitted from different cells may be transmitted in different areas, preventing CSI-RSs transmitted from the different cells from causing interference to each other is possible.

Figure 3:
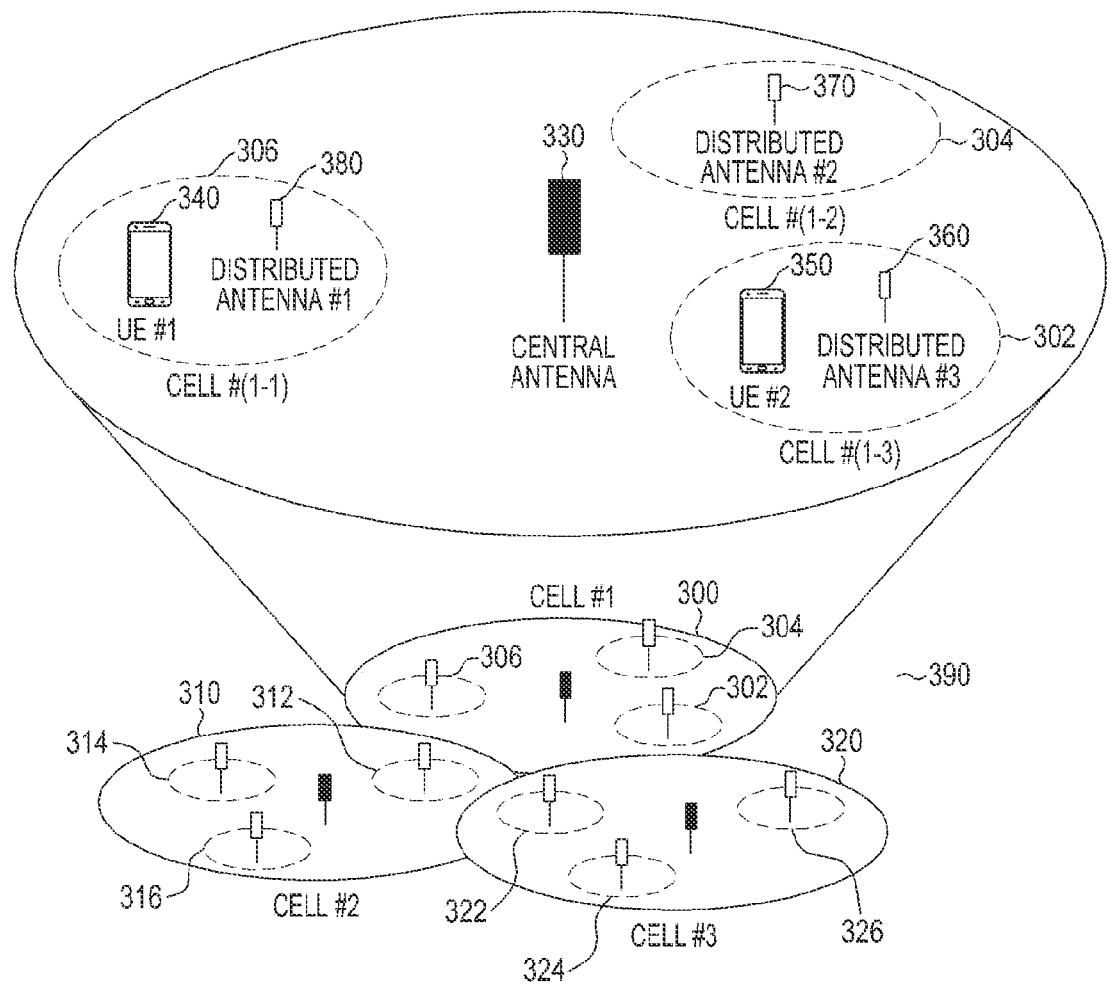
FIG. 3 illustrates architecture of a mobile communication system configured by applying Coordinated Multi-Point operation (CoMP) to a cellular communication system according to an embodiment of the present disclosure.

FIG. 3 illustrates architecture of a mobile communication system configured by applying Coordinated Multi-Point operation (CoMP) to a cellular communication system according to an embodiment of the present disclosure.

Referring to FIG. 3, it will be assumed that a communication system 390 includes a first cell 300, a second cell 310 and a third cell 320, at the center of each of which a central antenna is installed, and a plurality of distributed antennas are installed in different positions within each respective cell.

The central antenna installed at the center of each cell may transmit signals to UEs with higher transmit power, forming a macro cell having a wide coverage, while the distributed antennas installed in different positions in the cell may transmit signals to UEs with lower transmit power, forming small cells (or micro cells) having a narrow coverage. In other words, each of the first to third cells 300, 310 and 320 corresponds to a macro cell, and each of the cells 302, 304, 306, 312, 314, 316, 322, 324 and 326 included in each of the macro cells corresponds to a micro cell.

The central antenna and each of the distributed antennas may be comprised of one or multiple antennas, and a set of one or multiple antennas installed at the same point will be referred to herein as a 'point'. Depending on the perspective of signal transmission and reception of an eNB, the point may be divided into a Transmission Point (TP) from the perspective of signal transmission and a Reception Point (RP) from the perspective of signal reception.

In the first cell 300, which is a macro cell, a central antenna (or a central point) 330 and a plurality of distributed antennas (or distributed points) 360, 370 and 380 may be installed. The first distributed antenna 380 forms a cell #(1-1) 306, the second distributed antenna 370 forms a cell #(1-2) 304, and the third distributed antenna 360 forms a cell #(1-3) 302. The central antenna 330 and the distributed antennas 360, 370 and 380 are all connected to a central antenna and controlled by the central controller, and the central antenna 330 may provide a communication service to all UEs (e.g., first UE 340 and second UE 350) located in the first cell 300.

Because the second UE 350 is located closer to the central antenna 330 compared with the first UE 340, the central antenna 330 may support a higher data transfer rate to the second UE 350 than the first UE 340. Accordingly, the central antenna 330 may have a supportable transfer rate for the first UE 340 may be lower than supportable transfer rate for the UE 350. Typically, as a transmission path for a transmission signal is longer, the signal reception of the transmission path quality is lower. To solve these problems of the cellular communication system, CoMP may be widely used. CoMP is a scheme of arranging a plurality of distributed antennas in a cell. The CoMP may be used to select the optimal distributed antenna depending on the location of a UE, and to provide a communication service with the selected distributed antenna. As a result, the data transfer rate may be improved.

For example, the first UE 340 performs communication with the first distributed antenna 380 having a best channel environment for the first UE 340, and the second UE 350 performs communication with the third distributed antenna 360 having a best channel environment for the UE 350, so that the first UE 340 and the second UE 350 may be provided with higher-rate data services. In this case, the central antenna 330 may serve to support a mobile communication service requiring a broader coverage, a mobile communication service requiring the more robust quality, and the inter-cell mobility of UEs.

DL CoMP for improving the DL performance may include Joint Transmission (JT), Dynamic Point Selection (DPS), Coordinated Scheduling/Coordinated Beamforming (CS/CB), and a combination thereof. JT corresponds to a scheme in which multiple transmission points jointly transmit signals to a UE using the same wireless resource. DPS corresponds to a scheme in which for a signal to be transmitted to a UE, a single transmission point transmits the signal, and the transmission point varies dynamically. CS/CB corresponds to a scheme in which for a signal to be transmitted to a UE, a single transmission point transmits the signal, however, multiple transmission points perform scheduling and beamforming in a coordinated manner.

Uplink (UL) CoMP for improving the UL performance may include Joint Reception (JR), DPS, CS/CB, and a combination thereof. JR corresponds to a scheme in which a signal transmitted by a UE is jointly received at multiple reception points. DPS corresponds to a scheme in which a signal transmitted by a UE is received at a single reception point, and the reception point varies dynamically. CS/CB corresponds to a scheme in which a signal transmitted by a UE is received at a single reception point, however, multiple reception points perform scheduling and beamforming in a coordinated manner.

In a communication system to which CoMP is applied, an eNB may transmit CSI-RSs for measuring a channel state and an interference state in different areas of the physical resource structure to correspond to the eNB's own associated macro cells or micro cells, allowing a UE to distinguish all cells including the macro cell and the micro cells. In this case, each cell may be assigned one or more CSI processes, and each CSI process may be comprised of a CSI-RS resource corresponding to an area to which a CSI-RS for measuring a channel state is allocated in the physical resource structure, and a CSI-IM resource corresponding to an area to which a zero-power CSI-RS for measuring an interference state is allocated. A UE may measure a channel state and an interference state of a DL channel through the CSI process.

For example, a CSI-RS for measuring a channel state for the first cell 300 may be allocated to an area corresponding to reference numeral 200 illustrated in FIG. 2, and a zero-power CSI-RS for measuring an interference state may be allocated to an area corresponding to reference numeral 210. A CSI-RS for measuring a channel state for the second cell 310 may be allocated to an area corresponding to reference numeral 201, and zero-power CSI-RSs for measuring an interference state may be allocated to areas corresponding to reference numerals 205 and 211. A CSI-RS for measuring a channel state for the third cell 320 may be allocated to an area corresponding to reference numeral 202, and zero-power CSI-RSs for measuring an interference state may be allocated to areas corresponding to reference numerals 206 and 212.

In the case of micro cells included in the first cell (or the macro cell) 300, a CSI-RS for measuring a channel state for the cell #(1-1) 306 may be allocated to an area corresponding to reference numeral 203, and zero-power CSI-RSs for measuring an interference state may be allocated to areas corresponding to reference numerals 207 and 213. A CSI-RS for measuring a channel state for the cell #(1-2) 304 may be allocated to an area corresponding to reference numeral 216, and zero-power CSI-RSs for measuring an interference state may be allocated to areas corresponding to reference numerals 208 and 214. A CSI-RS for measuring a channel state for the cell #(1-3) 302 may be allocated to an area corresponding to reference numeral 217, and zero-power CSI-RSs for measuring an interference state may be allocated to areas corresponding to reference numerals 209 and 215.

In this way, by allocating different time-frequency resources to a DSI-RS and a zero-power CSI-RS(s), which are transmitted from each macro cell or each micro cell, preventing DSI-RSs and zero-power CSI-RSs transmitted from different cells from causing interference to each other is possible. As a result, a UE may measure more accurate channel state and interference state.

Figure 4:
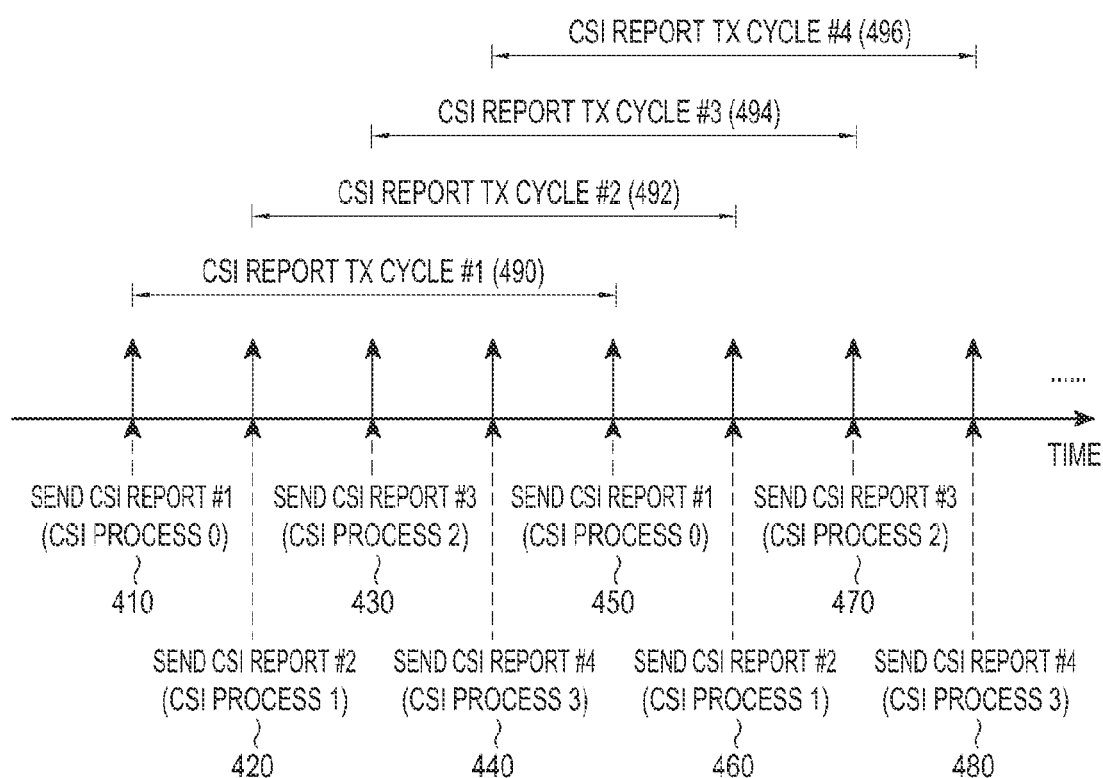
FIG. 4 illustrates an example of sending a Channel State Information (CSI) report for a Downlink (DL) channel by a User Equipment (UE) in a mobile communication system such as, for example, the mobile communication system illustrated in FIG. 3 according to an embodiment of the present disclosure.

FIG. 4 illustrates an example of sending a CSI report for a DL channel by a UE in a mobile communication system such as, for example, the mobile communication system illustrated in FIG. 3 according to an embodiment of the present disclosure.

Referring to FIG. 4, a UE may measure a channel state and an interference state of a DL channel from a CSI process comprised of a CSI-RS resource and a CSI-IM resource, configure a CSI report based on the measurement results, and send the CSI report to an eNB. It will be assumed herein that four CSI processes (e.g., CSI process #0, CSI process #1, CSI process #2, CSI process #3) are assigned to a UE.

A UE may configure a CSI report corresponding to each CSI process, and send the configured CSI report to an eNB depending on predefined CSI report transmission cycle and transmission time. The CSI report transmission cycle and transmission time mean the values which are defined by an agreement made in advance between the UE and the eNB. In other words, the UE may send a first CSI report for the CSI process #0 at transmission times 410 and 450 depending on a first CSI report transmission cycle 490, send a second CSI report for the CSI process #1 at transmission times 420 and 460 depending on a second CSI report transmission cycle 492, send a third CSI report for the CSI process #2 at transmission times 430 and 470 depending on a third CSI report transmission cycle 494, and send a fourth CSI report for the CSI process #3 at transmission times 440 and 480 depending on a fourth CSI report transmission cycle 496.

Meanwhile, in the LTE or LTE-A communication system, a Discontinuous Reception (DRX) mode is defined and used to minimize the battery consumption of UEs. The DRX mode is an operation mode of allowing a UE to monitor a Physical Downlink Control Channel (PDCCH) only in an active time period in a predefined DRX cycle. The DRX mode will be described in more detail below with reference to FIG. 5.

Figure 5:
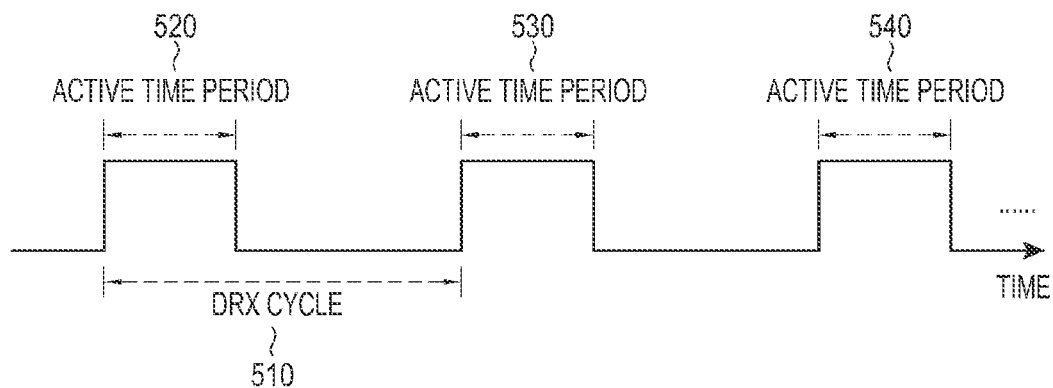
FIG. 5 illustrates a Discontinuous Reception (DRX) cycle and an active time period defined in accordance with a DRX mode according to an embodiment of the present disclosure.

FIG. 5 illustrates a DRX cycle and an active time period defined in accordance with a DRX mode according to an embodiment of the present disclosure.

Referring to FIG. 5, a DRX cycle 510 may include an active time period 520, and the DRX cycle 510 indicates the time interval at which a UE may perform a DRX operation.

A UE operating in the DRX mode may perform the common signal transmission/reception operation during active time periods 520, 530 and 540, and may perform no signal reception operation and minimize even the signal transmission operation during the remaining time period except for the active time periods 520, 530 and 540, thereby minimizing the battery consumption. The active time periods 520, 530 and 540 may be adjusted by predefined timers. The active time periods 520, 530 and 540 may be determined as the values which are defined by an agreement made in advance between the UE and the eNB. The active time periods 520, 530 and 540 may be extended by a predetermined length of time if the UE sends a Scheduling Request message to the eNB, or if the UE is allocated resources for UL data transmission from the eNB.

Figure 6:
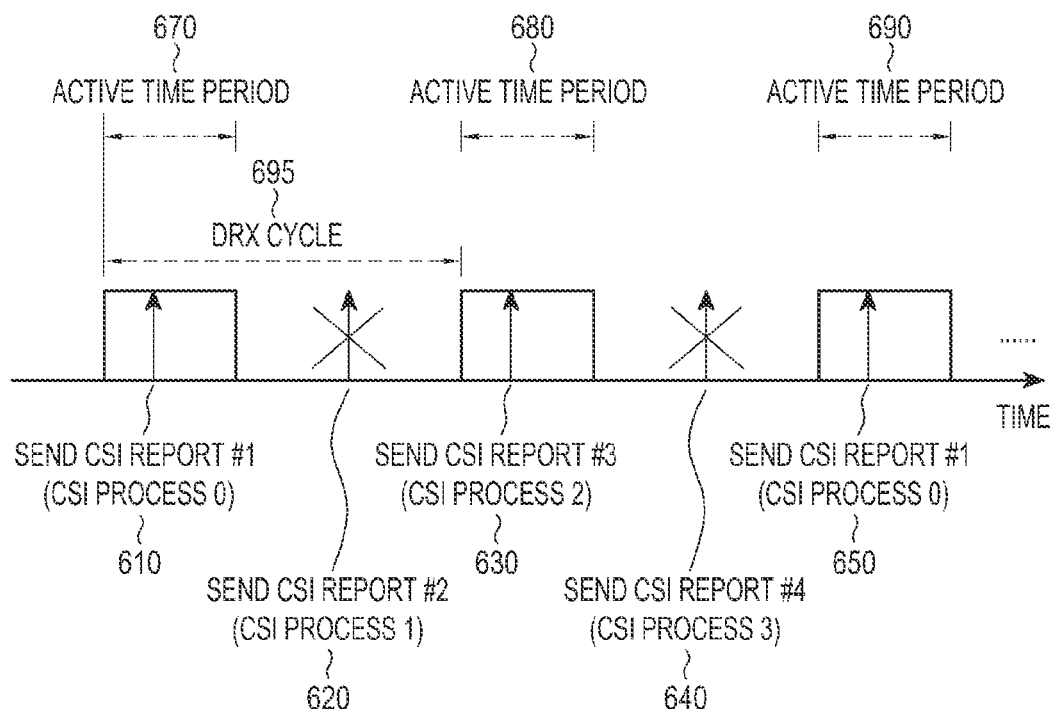
FIG. 6 illustrates an example of sending a CSI report for a DL channel by a UE operating in a DRX mode in a mobile communication system such as, for example, the mobile communication system illustrated in FIG. 3 according to an embodiment of the present disclosure.

FIG. 6 illustrates an example of sending a CSI report for a DL channel by a UE operating in a DRX mode in a mobile communication system such as, for example, the mobile communication system illustrated in FIG. 3 according to an embodiment of the present disclosure.

Referring to FIG. 6, a UE may measure a channel state and an interference state of a DL channel for each CSI process comprised of a CSI-RS resource and a CSI-IM resource, configure a CSI report based on the measurement results, and send it to an eNB. It will be assumed herein that four CSI processes (e.g., CSI process #0, CSI process #1, CSI process #2, CSI process #3) are assigned to a UE.

The UE may configure a CSI report corresponding to each CSI process, and send the configured CSI report to the eNB at predefined transmission time.

However, because a UE operating in the DRX mode may perform the signal transmission/reception operation only in active time periods 670, 680 and 690, the UE may send a CSI report at transmission times 610, 630 and 650 included in the active time periods 670, 680 and 690, but may not send a CSI report at transmission times 620 and 640 which are not included in the active time periods 670, 680 and 690. In other words, the UE operating in the DRX mode may not send second and fourth CSI reports to the eNB, so the eNB may not receive CSI reports for the CSI processes #1 and #3, having limitations on providing CoMP-based communication services to UEs. Namely, the eNB may have difficulty in selecting the optimal distributed antenna depending on the location of the UE and providing a communication service with the selected antenna, resulting in degradation of the system performance. If this pattern is repeated periodically, the system performance degradation may further increase.

A way to send a CSI report to an eNB by a UE operating in the DRX mode in a mobile communication system supporting CoMP will be described below with reference to first to fourth embodiments of the present disclosure.

First Embodiment of the Present Disclosure

A first embodiment of the present disclosure corresponds to a way to implicitly configure and operate a CSI report in different ways depending on whether a UE operates in the DRX mode in a mobile communication system supporting CoMP. A method of transmitting and receiving a CSI report according to the first embodiment of the present disclosure will be described in more detail below with reference to FIGS. 7, 8, and 9.

Figure 7:
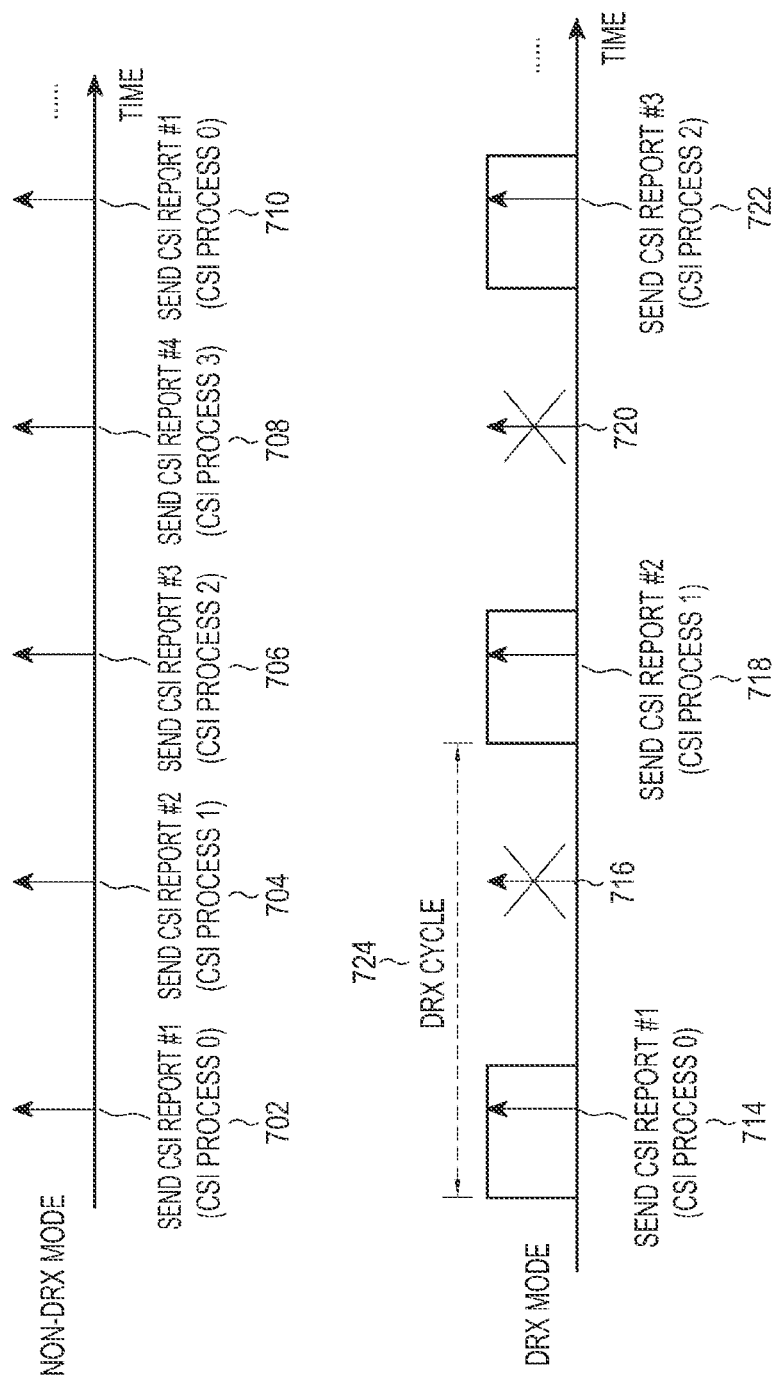
FIG. 7 illustrates an example of sending a CSI report for a DL channel by a UE in a mobile communication system supporting CoMP according to a first embodiment of the present disclosure.

FIG. 7 illustrates an example of sending a CSI report for a DL channel by a UE in a mobile communication system supporting CoMP according to a first embodiment of the present disclosure.

Referring to FIG. 7, a UE may measure a channel state and an interference state of a DL channel from a CSI process comprised of a CSI-RS resource and a CSI-IM resource, configure a CSI report based on the measurement results, and send the CSI report to an eNB. It will be assumed herein that four CSI processes (e.g., CSI process #0, CSI process #1, CSI process #2, CSI process #3) are assigned to a UE.

The eNB may provide CSI report setting information including CSI report transmission cycle $N_{pd,i}$ and transmission time $N_{OFFSET,CQI,i}$ for a CSI process #i, to the UE by signaling. The UE may check the UE operation mode to determine whether the UE operates in a non-DRX mode. If the UE operates in the non-DRX mode, the UE may send a CSI report corresponding to each CSI process to the eNB depending on the CSI report setting information which is signaled from the eNB for each CSI process. For a UE operating in the non-DRX mode, a CSI report corresponding to each CSI process may be sent to the UE in a subframe satisfying Equation (1) below. In other words, a transmission time of the CSI report may be calculated in accordance with Equation (1).

$$(10 \times n_f + \lfloor n_s/2 \rfloor - N_{OFFSET,CQI,i}) \bmod (N_{pd,i}) = 0 \quad \text{Equation (1)}$$

where $n_f$ denotes a radio frame index, $n_s$ denotes a slot index, 'A mod B' denotes a remainder obtained by dividing A by B, and $\lfloor n_s/2 \rfloor$ denotes a floor function of $n_s/2$. One radio frame includes 10 subframes, and one subframe includes two slots.

In other words, a UE operating in the non-DRX mode may send a first CSI report for the CSI process #0 at transmission times 702 and 710, send a second CSI report for the CSI process #1 at a transmission time 704, send a third CSI report for the CSI process #2 at a transmission time 706, and send a fourth CSI report for the CSI process #3 at a transmission time 708.

However, after checking (e.g., determining) the UE operation mode, if the UE determines that the UE operates in the DRX mode, the UE may adjust the transmission time used for sending a CSI report taking into account the CSI report setting information and DRX setting information instead of taking into account the CSI report setting information provided by the eNB by signaling, and send the CSI report to the eNB at the adjusted transmission time. The DRX setting information may include information about a DRX cycle 724 indicating the time interval at which a UE may perform a DRX operation, and timer information for controlling an active time period for which a UE may perform the common signal transmission/reception operation within the DRX cycle 724.

In other words, a UE operating in the DRX mode may calculate a CSI report transmission time for each CSI process in accordance with Equation (1), and determine whether the calculated transmission time is included in (or falls within) the active time period. If the calculated transmission time is included in the active time period, and does not overlap transmission times of other CSI reports, the UE may send the CSI report at the calculated transmission time. However, if the calculated transmission time is not included in the active time period, or if the calculated transmission time is included in the active time period, but overlaps transmission times of other CSI reports, the UE may send the CSI report in the next active time period.

For example, a UE operating in the DRX mode may calculate a transmission time 714 of a first CSI report for the CSI process #0, and determine whether the transmission time 714 is included in an active time period. Because the transmission time 714 is included in an active time period, and does not overlap other transmission times, the UE may send the first CSI report at the transmission time 714. The UE may calculate a transmission time 716 of a second CSI report for the CSI process #1, and determine whether the transmission time 716 is included in the active time period. However, because the transmission time 716 is not included in the active time period, the UE may adjust the transmission time to a transmission time 718, which is included in the next active time period. In other words, the UE may send the second CSI report at the transmission time 718 instead of the transmission time 716. Similarly, the UE may calculate the transmission time 718 of a third CSI report for the CSI process #2, and determine whether the calculated transmission time 718 is included in the active time period. However, because the transmission time 718 is included in the active time period, but overlaps a transmission time of another CSI report (e.g., the second CSI report), the UE may adjust the transmission time to a transmission time 722, which is included in the next active time period (e.g., with transmission time 720 not being included in an active period). In other words, the UE may send the third CSI report at the transmission time 722 instead of the transmission time 718.

As such, in the CSI report transmission method according to the first embodiment of the present disclosure, if a UE operates in the non-DRX mode, the UE may sequentially send CSI reports for CSI processes #0 to #3 at pre-calculated transmission times, and if a UE operates in the DRX mode, the UE may sequentially send CSI reports for CSI processes #0 to #3 during the active time periods. In accordance with the first embodiment of the present disclosure, a UE sending a CSI report may calculate CSI report setting information used when the UE operates in the DRX mode, from the CSI report setting information and DRX setting information for the non-DRX mode, instead of separately receiving the CSI report setting information, which is signaled from an eNB, and is to be applied when the UE operates in the DRX mode, thereby making maintaining the CSI report transmission order that is set for a UE in the non-DRX mode possible, even in a DRX-mode UE without change.

Figure 8:
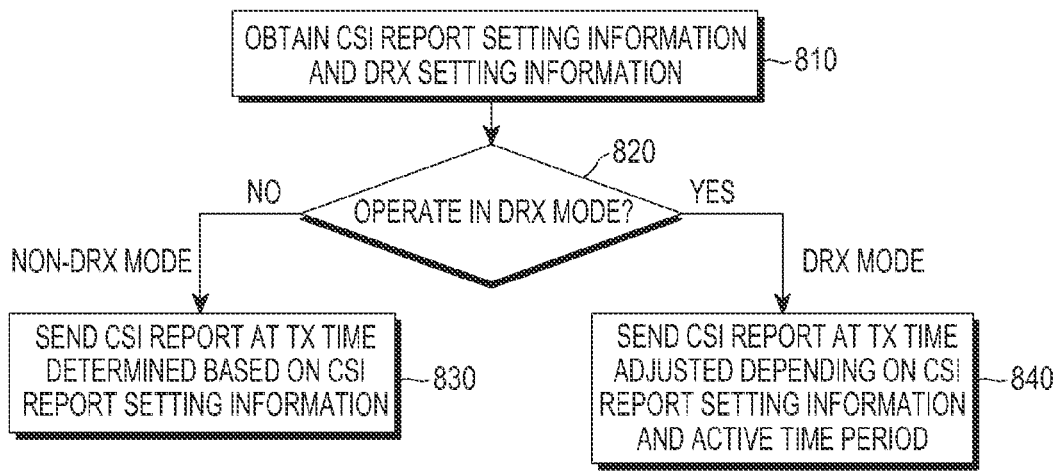
FIG. 8 is a flowchart illustrating a process of sending a CSI report for a DL channel by a UE in a mobile communication system supporting CoMP according to the first embodiment of the present disclosure.

FIG. 8 is a flowchart illustrating a process of sending a CSI report for a DL channel by a UE in a mobile communication system supporting CoMP according to the first embodiment of the present disclosure.

Referring to FIG. 8, at operation 810, a UE may obtain CSI report setting information and DRX setting information from an eNB. The CSI report setting information and DRX setting information may be transmitted over a PDSCH, which is a DL physical data channel.

At operation 820, the UE may determine whether the UE operates in the DRX mode (e.g., by checking an operation mode of the UE).

If the UE determines that the UE does not operate in the DRX mode (e.g., if the UE operates in the non-DRX mode) at operation 820, then the UE may proceed to operation 830 at which the UE may send a CSI report for each CSI process to the eNB at a transmission time determined based on the obtained CSI report setting information.

In contrast, if the UE determines that the UE operates in the DRX mode at operation 820, then the UE may proceed to operation 840 at which the UE may adjust a transmission time depending on the obtained CSI report setting information and the active time period included in the DRX setting information, and send the CSI report to the eNB at the adjusted transmission time.

The CSI report sent by the UE may be transmitted over a Physical Uplink Control Channel (PUCCH) which is a UL physical control channel, or a Physical Uplink Shared Channel (PUSCH) which is a UL physical data channel.

Figure 9:
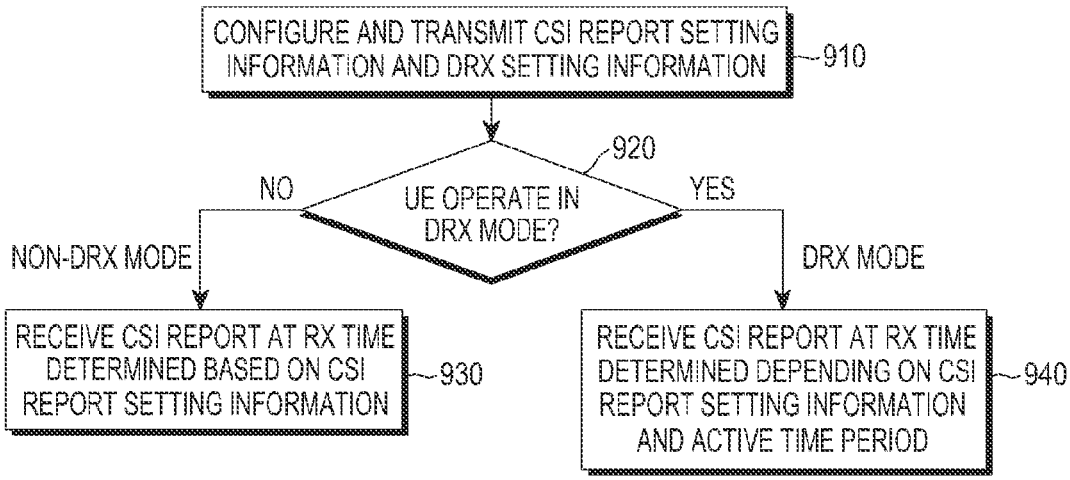
FIG. 9 is a flowchart illustrating a process of receiving a CSI report for a DL channel by an eNB in a mobile communication system supporting CoMP according to the first embodiment of the present disclosure.

FIG. 9 is a flowchart illustrating a process of receiving a CSI report for a DL channel by an eNB in a mobile communication system supporting CoMP according to the first embodiment of the present disclosure.

Referring to FIG. 9, at operation 910, an eNB may configure CSI report setting information and DRX setting information, and transmit the CSI report setting information and DRX setting information to a UE.

At operation 920, the eNB may determine whether the UE operates in the DRX mode (e.g., by checking an operation mode of the UE).

If the eNB determines that the UE does not operate in the DRX mode (e.g., if the UE operates in the non-DRX mode), at operation 920, then the eNB may proceed to operation 930 at which the eNB may receive a CSI report from the UE at a reception time determined based on the configured CSI report setting information.

In contrast, if the eNB determines that the UE operates in the DRX mode at operation 920, then the eNB may proceed to operation 940 at which the eNB may receive a CSI report from the UE at a reception time that is determined depending on the configured CSI report setting information and the active time period included in the DRX setting information.

Second Embodiment of the Present Disclosure

A second embodiment of the present disclosure corresponds to another way to implicitly configure and operate a CSI report in different ways depending on whether a UE operates in the DRX mode in a mobile communication system supporting CoMP. A method of transmitting and receiving a CSI report according to the second embodiment will be described in more detail below with reference to FIGS. 10, 11, and 12.

Figure 10:
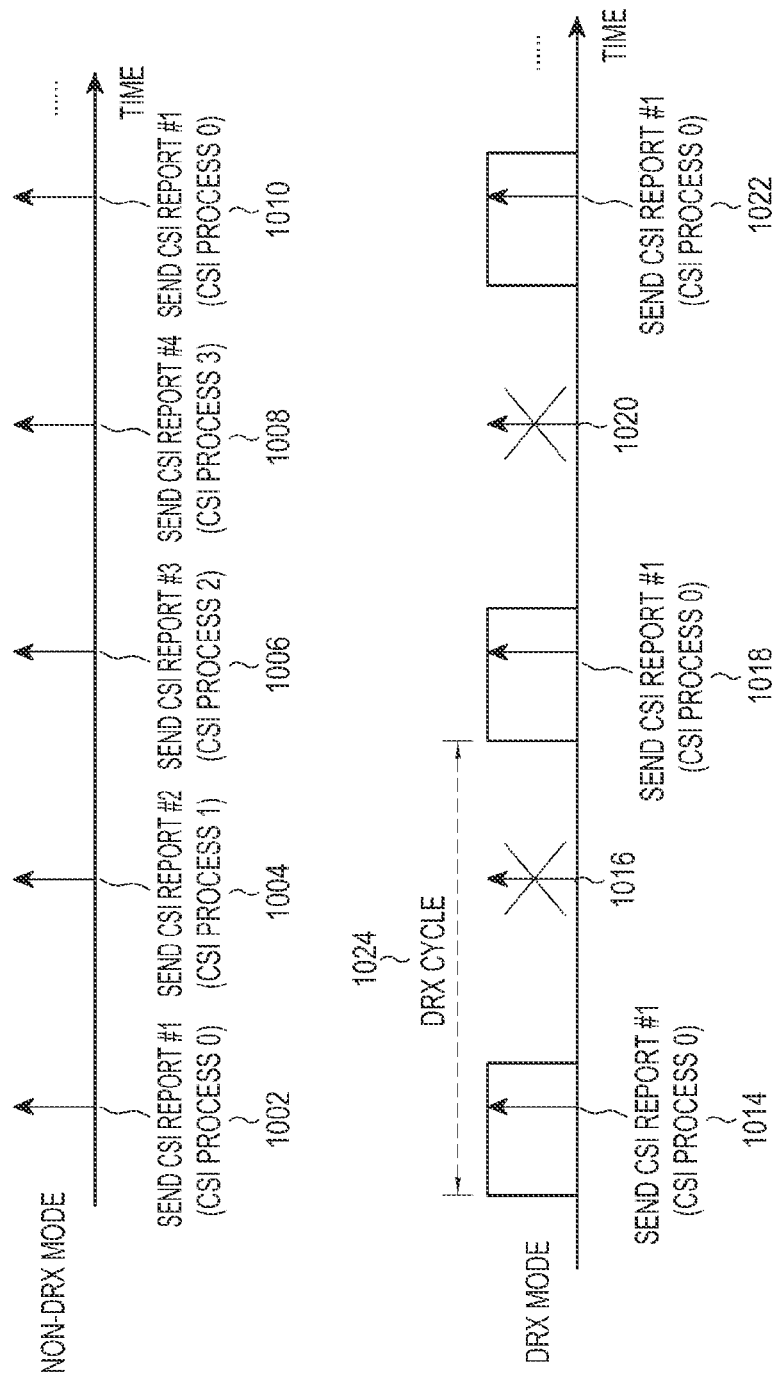
FIG. 10 illustrates an example of sending a CSI report for a DL channel by a UE in a mobile communication system supporting CoMP according to a second embodiment of the present disclosure.

FIG. 10 illustrates an example of sending a CSI report for a DL channel by a UE in a mobile communication system supporting CoMP according to a second embodiment of the present disclosure.

Referring to FIG. 10, a UE may measure a channel state and an interference state of a DL channel from a CSI process comprised of a CSI-RS resource and a CSI-IM resource, configure a CSI report based on the measurement results, and send the CSI report to an eNB. It will be assumed herein that four CSI processes (for example, CSI process #0, CSI process #1, CSI process #2, CSI process #3) are assigned to a UE.

The UE may check its operation mode to determine whether the UE operates in the non-DRX mode. If the UE operates in the non-DRX mode, the UE may send a first CSI report for the CSI process #0 at transmission times 1002 and 1010, send a second CSI report for the CSI process #1 at a transmission time 1004, send a third CSI report for the CSI process #2 at a transmission time 1006, and send a fourth CSI report for the CSI process #3 at a transmission time 1008. The transmission times 1002 and 1010 may be calculated in accordance with Equation (1), and a detailed description thereof will be omitted. In other words, the UE operating in the non-DRX mode may sequentially send CSI reports for CSI processes #0 to #3 at pre-calculated transmission times.

However, after checking the UE operation mode, if the UE is determined to operate in the DRX mode, the UE may adjust the transmission time used for sending a CSI report taking into account the CSI report setting information, DRX setting information and CSI process's priority (e.g., high-priority CSI process), instead of taking into account the CSI report setting information provided by the eNB by signaling, and send the CSI report for the high-priority CSI process to the eNB at the adjusted transmission time. The DRX setting information may include information about a DRX cycle 1024 indicating the time interval at which a UE may perform a DRX operation, and timer information for controlling an active time period for which a UE may perform the common signal transmission/reception operation within the DRX cycle 1024.

In other words, a UE operating in the DRX mode may calculate a CSI report transmission time for each CSI process in accordance with Equation (1), and determine whether the calculated transmission time is included in the active time period. If the calculated transmission time is included in the active time period, the UE may send the CSI report for the high-priority CSI process at the calculated transmission time. However, if the calculated transmission time is not included in the active time period, the UE may not send the CSI report.

For example, the UE operating in the DRX mode may calculate transmission times 1014, 1016, 1018, 1020 and 1022 of first to fourth CSI reports for CSI processes #0 to #3, and determine whether each transmission time is included in the active time period. It will be assumed herein that the CSI process #0 among the CSI processes #0 to #3 has the highest priority, and information about the CSI process #0 having the highest priority is provided to a UE by an eNB by signaling. Thereafter, the UE may send the first CSI report for the high-priority CSI process #0 to the eNB at the transmission times 1014, 1018 and 1022 included in the active time period, and send no CSI report to the eNB at the other transmission times 1016 and 1020.

Although it is assumed in FIG. 10 that an eNB provides information about the high-priority CSI process to a UE by signaling, the information about the high-priority CSI process may be determined as a CSI process having the lowest CSI process index without separate signaling. The eNB may operate CoMP for UEs employing the limited transmission time period like the DRX mode. The eNB may operate the CSI process corresponding to a required CSI report, as a high-priority CSI process. For example, the eNB may operate the CSI process corresponding to a macro Transmission Point (TP) as the high-priority CSI process.

As such, in the CSI report transmission method according to the second embodiment of the present disclosure, if a UE operates in the non-DRX mode, the UE may sequentially send CSI reports for CSI processes #0 to #3 at pre-calculated transmission times, and if a UE operates in the DRX mode, the UE may send a CSI report for the highest-priority CSI process during the active time period. According to the second embodiment of the present disclosure, a UE sending a CSI report may calculate CSI report setting information for the non-DRX mode, and a CSI report transmission time used when the UE operates in the DRX mode, from the CSI report setting information, instead of separately receiving the CSI report setting information, which is signaled from an eNB, and is to be applied when the UE operates in the DRX mode, thereby making sending a CSI report for the high-priority CSI process at the calculated transmission time possible.

Figure 11:
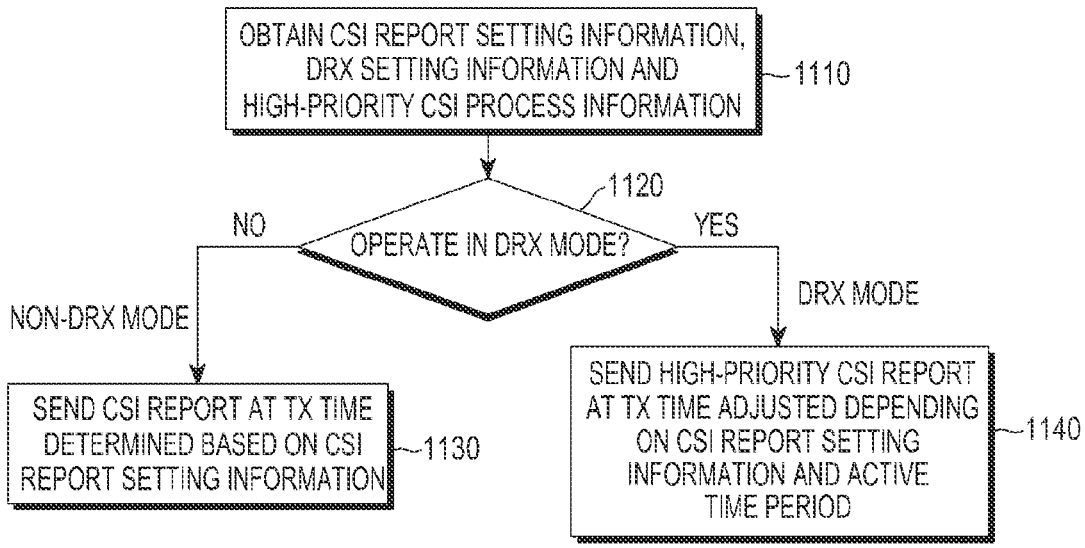
FIG. 11 is a flowchart illustrating a process of sending a CSI report for a DL channel by a UE in a mobile communication system supporting CoMP according to the second embodiment of the present disclosure.

FIG. 11 is a flowchart illustrating a process of sending a CSI report for a DL channel by a UE in a mobile communication system supporting CoMP according to the second embodiment of the present disclosure.

Referring to FIG. 11, at operation 1110, a UE may obtain CSI report setting information, DRX setting information and high-priority CSI process information from an eNB. The CSI report setting information, DRX setting information and high-priority CSI process information may be transmitted over a PDSCH, which is a DL physical data channel.

At operation 1120, the UE may determine whether the UE operates in the DRX mode (e.g., by checking an operation mode of the UE).

If the UE determines that the UE does not operate in the DRX mode (e.g., if the UE operates in the non-DRX mode) at operation 1120, then the UE may proceed to operation 1130 at which the UE may send a CSI report for each CSI process to the eNB at a transmission time determined based on the obtained CSI report setting information.

In contrast, if the UE determines that the UE operates in the DRX mode at operation 1120, then the UE may proceed to operation 1140 at which the UE may adjust a transmission time depending on the obtained CSI report setting information and the active time period included in the DRX setting information, and send the CSI report for the high-priority CSI process to the eNB at the adjusted transmission time. The CSI report transmitted at the adjusted transmission time may be transmitted over a PUCCH which is a UL physical control channel, or a PUSCH which is a UL physical data channel.

Figure 12:
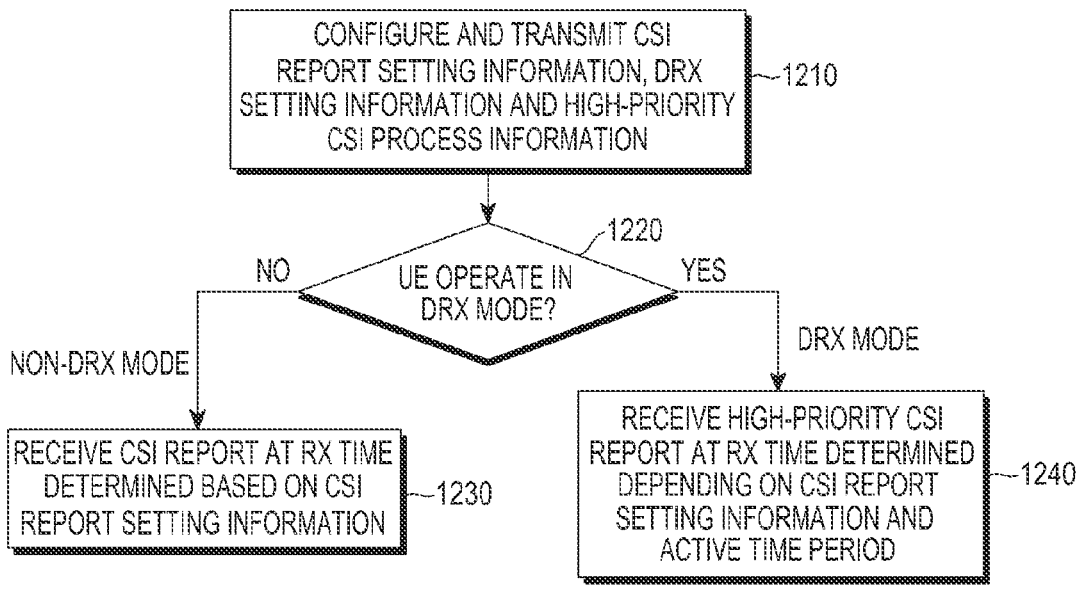
FIG. 12 is a flowchart illustrating a process of receiving a CSI report for a DL channel by an eNB in a mobile communication system supporting CoMP according to the second embodiment of the present disclosure.

FIG. 12 is a flowchart illustrating a process of receiving a CSI report for a DL channel by an eNB in a mobile communication system supporting CoMP according to the second embodiment of the present disclosure.

Referring to FIG. 12, at operation 1210, an eNB may configure CSI report setting information, DRX setting information, and high-priority CSI process information, and transmit the CSI report setting information, the DRX setting information, and the high-priority CSI process information to a UE.

At operation 1220, the eNB may determine whether the UE operates in the DRX mode (e.g. by checking the operation of the UE).

If the eNB determines that the UE does not operate in the DRX mode (e.g., if the UE operates in the non-DRX mode) at operation 1220, then the eNB may proceed to operation 1230 at which the eNB may receive a CSI report from the UE at a reception time determined based on the configured CSI report setting information.

If the eNB determines that the UE operates in the DRX mode at operation 1220, then the eNB may proceed to operation 1240 at which the eNB may receive a CSI report for the high-priority CSI process from the UE at a reception time that is determined depending on the configured CSI report setting information and the active time period included in the DRX setting information.

The above-described second embodiment of the present disclosure may be generalized by expanding it to any systems other than the mobile communication system to which CoMP is applied. For example, in a Carrier Aggregation (CA) system including a plurality of Component Carriers (CCs), a CSI process corresponding to a high-priority primary CC may be operated as a high-priority CSI process. Also, in a massive antenna system or a Full Dimension Multiple Input Output (FD-MIMO) including a plurality of transmit antennas, one of a CSI process corresponding to a wide beam and a CSI process corresponding to a narrow beam may be operated as a high-priority CSI process, or one of a CSI process corresponding to a horizontal CSI in the spatial domain and a CSI process corresponding to a vertical CSI may be operated as a high-priority CSI process.

Third Embodiment of the Present Disclosure

A third embodiment of the present disclosure corresponds to another way to implicitly configure and operate a CSI report in different ways depending on whether a UE operates in the DRX mode in a mobile communication system supporting CoMP. A method of transmitting and receiving a CSI report according to the third embodiment of the present disclosure will be described in more detail below with reference to FIGS. 13, 14, and 15.

Figure 13:
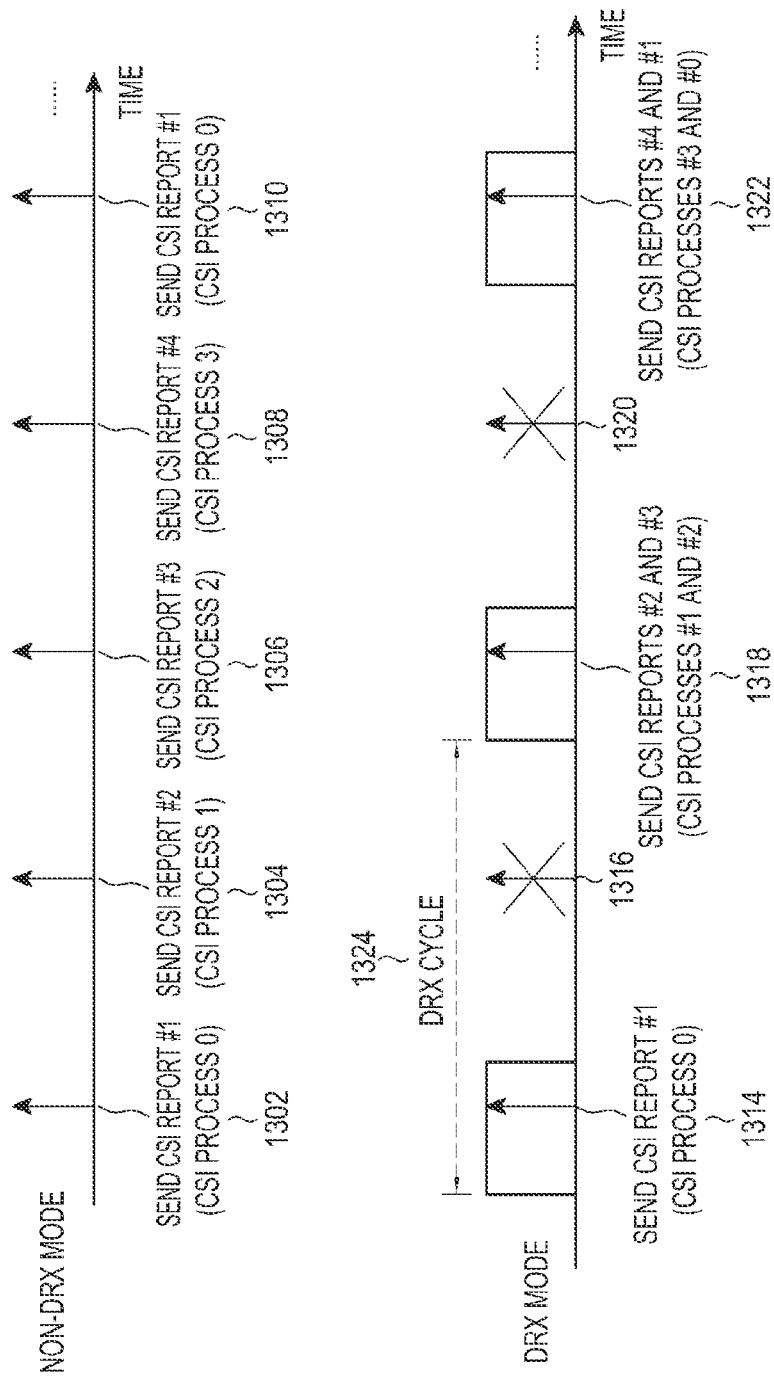
FIG. 13 illustrates an example of sending a CSI report for a DL channel by a UE in a mobile communication system supporting CoMP according to a third embodiment of the present disclosure.

FIG. 13 illustrates an example of sending a CSI report for a DL channel by a UE in a mobile communication system supporting CoMP according to a third embodiment of the present disclosure.

Referring to FIG. 13, a UE may measure a channel state and an interference state of a DL channel from a CSI process comprised of a CSI-RS resource and a CSI-IM resource, configure a CSI report based on the measurement results, and send the CSI report to an eNB. It will be assumed herein that four CSI processes (e.g., CSI process #0, CSI process #1, CSI process #2, CSI process #3) are assigned to a UE.

The UE may check the UE operation mode to determine whether the UE operates in the non-DRX mode. If the UE operates in the non-DRX mode, the UE may send a first CSI report for the CSI process #0 at transmission times 1302 and 1310, send a second CSI report for the CSI process #1 at a transmission time 1304, send a third CSI report for the CSI process #2 at a transmission time 1306, and send a fourth CSI report for the CSI process #3 at a transmission time 1308. The transmission times 1302 and 1310 may be calculated in accordance with Equation (1), and a detailed description thereof will be omitted. In other words, the UE operating in the non-DRX mode may sequentially send CSI reports for CSI processes #0 to #3 at pre-calculated transmission times.

However, after checking the UE operation mode, if the UE is determined to operate in the DRX mode, the UE may adjust the transmission time used for sending a CSI report taking into account the CSI report setting information and DRX setting information, instead of taking into account the CSI report setting information provided by the eNB by signaling, and send the CSI report to the eNB at the adjusted transmission time. The DRX setting information may include information about a DRX cycle 1324 indicating the time interval at which a UE may perform a DRX operation, and timer information for controlling an active time period for which a UE may perform the common signal transmission/reception operation within the DRX cycle 1324.

In other words, a UE operating in the DRX mode may calculate a CSI report transmission time for each CSI process in accordance with Equation (1), and determine whether the calculated transmission time is included in the active time period. If the calculated transmission time is included in the active time period, the UE may send the CSI report at the calculated transmission time. However, if the calculated transmission time is not included in the active time period, the UE may send the CSI report in the next active time period. If the newly adjusted CSI report transmission time overlaps other CSI report transmission times, the UE may send the CSI reports to the eNB at the same transmission time by multiplexing CSI reports.

For example, the UE operating in the DRX mode may calculate transmission times 1314, 1316, 1318, 1320 and 1322 of first to fourth CSI reports for CSI processes #0 to #3, and determine whether each transmission time is included in the active time period. Thereafter, the UE may send a CSI report to the eNB at the transmission times 1314, 1318 and 1322 included in the active time period, and may send no CSI report to the eNB at the other transmission times 1316 and 1320. In other words, the UE may send the first CSI report for the CSI process #0 at the transmission time 1314 included in the active time period, and may send the second CSI report for the CSI process #1 and the third CSI report for the CSI process #2, which have failed to be transmitted at the transmission times 1316, at the transmission time 1318 included in the next active time period by multiplexing the second CSI report for the CSI process #1 and the third CSI report for the CSI process #2. Thereafter, the UE may send the fourth CSI report for the CSI process #3 and the first CSI report for the CSI process #0, which have failed to be transmitted at the transmission time 1320, at the transmission time 1322 included in the next active time period by multiplexing the fourth CSI report for the CSI process #3 and the first CSI report for the CSI process #0.

In this case in which a UE sends at least two CSI reports by multiplexing the at least two CSI reports, the amount of its transmission information may be larger compared to when the UE sends one CSI report without multiplexing, so a UL transmission format should also vary depending on the increase in the amount of information. For example, on the assumption that a UE sends a CSI report to an eNB by applying PUCCH format #2 when sending one CSI report, if the UE sends multiple CSI reports by multiplexing the multiple CSI reports, the UE may send the CSI reports to the eNB by applying PUCCH format #3 or a PUSCH format that can accommodate the larger amount of information than PUCCH format #2. Information about the wireless resources that a UE will use in PUCCH format #2, PUCCH format #3 or PUSCH format may be provided to the UE by the eNB in advance by signaling.

As such, in the CSI report transmission method according to the third embodiment of the present disclosure, if a UE operates in the non-DRX mode, the UE may sequentially send CSI reports for CSI processes #0 to #3 at pre-calculated transmission times, and if a UE operates in the DRX mode, the UE may sequentially send CSI reports for CSI processes #0 to #3 during the active time period, however, if the newly adjusted CSI report transmission time overlaps other CSI report transmission times, the UE may send the CSI reports to the eNB at the same transmission time by multiplexing the CSI reports. In accordance with the third embodiment of the present disclosure, a UE sending a CSI report may calculate CSI report setting information for the non-DRX mode, and a CSI report transmission time used when the UE operates in the DRX mode, from the CSI report setting information, instead of separately receiving the CSI report setting information, which is signaled from an eNB, and is to be applied when the UE operates in the DRX mode, and may send multiple CSI reports whose transmission times overlap, at the calculated transmission time by multiplexing the multiple CSI reports, thereby making reduction (e.g., minimization) of the transmission delay of CSI reports possible.

Figure 14:
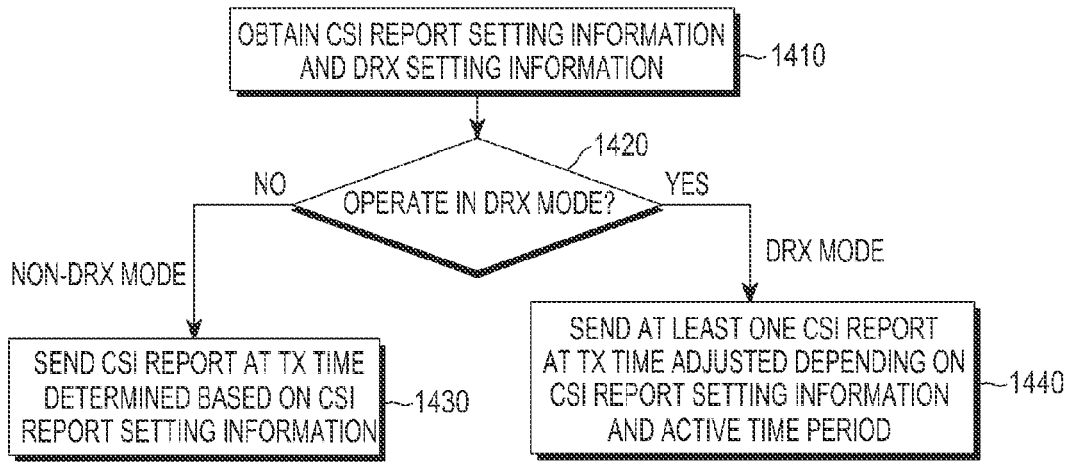
FIG. 14 is a flowchart illustrating a process of sending a CSI report for a DL channel by a UE in a mobile communication system supporting CoMP according to the third embodiment of the present disclosure.

FIG. 14 is a flowchart illustrating a process of sending a CSI report for a DL channel by a UE in a mobile communication system supporting CoMP according to the third embodiment of the present disclosure.

Referring to FIG. 14, at operation 1410, a UE may obtain CSI report setting information and DRX setting information from an eNB. The CSI report setting information and DRX setting information may be transmitted over a PDSCH, which is a DL physical data channel.

At operation 1420, the UE may determine whether the UE operates in the DRX mode (e.g., by checking an operation mode of the UE).

If the UE determines that the UE does not operate in the DRX mode (e.g., if the UE operates in the non-DRX mode) at operation 1420, then the UE may proceed to operation 1430 at which the UE may send a CSI report for each CSI process to the eNB at a transmission time determined based on the obtained CSI report setting information.

In contrast, if the UE determines that the UE operates in the DRX mode at operation 1420, then the UE may proceed to operation 1440 at which the UE may adjust a transmission time depending on the obtained CSI report setting information and the active time period included in the DRX setting information, and send at least one CSI report to the eNB at the adjusted transmission time. When sending one CSI report to the eNB, the UE may send the CSI report by applying PUCCH format #2, and when sending multiple CSI reports by multiplexing, the UE may send the multiple CSI reports by applying PUCCH format #3 or a PUSCH format that can accommodate the larger amount of information than PUCCH format #2.

The CSI report sent by the UE may be transmitted over a PUCCH which is a UL physical control channel, or a PUSCH which is a UL physical data channel.

Figure 15:
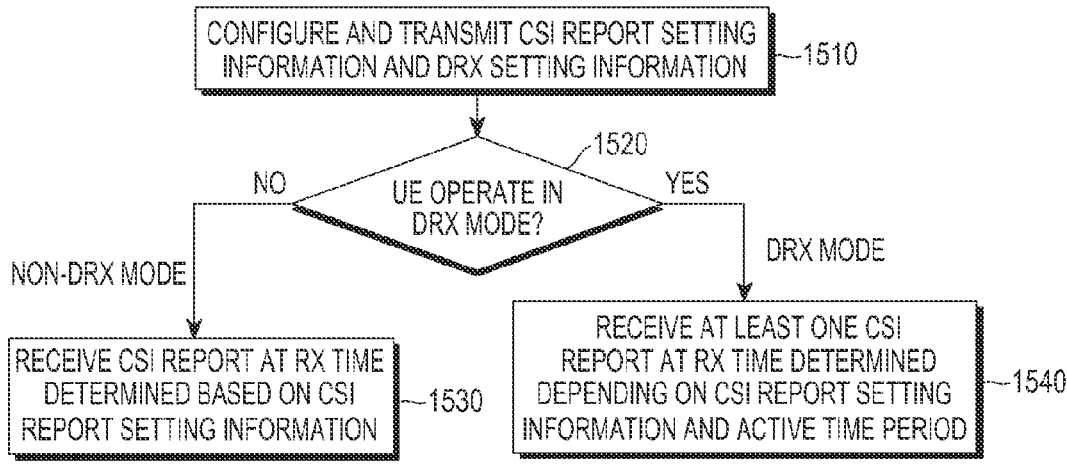
FIG. 15 is a flowchart illustrating a process of receiving a CSI report for a DL channel by an eNB in a mobile communication system supporting CoMP according to the third embodiment of the present disclosure.

FIG. 15 is a flowchart illustrating a process of receiving a CSI report for a DL channel by an eNB in a mobile communication system supporting CoMP according to the third embodiment of the present disclosure.

Referring to FIG. 15, at operation 1510, an eNB may configure CSI report setting information and DRX setting information, and transmit the CSI report setting information and the DRX setting information to a UE.

At operation 1520, the eNB may determine whether the UE operates in the DRX mode (e.g., by checking an operation mode of the UE).

If the eNB determines that the UE does not operate in the DRX mode (e.g., if the UE operates in the non-DRX mode) at operation 1520, then the eNB may proceed to operation 1530 at which the eNB may receive a CSI report from the UE at a reception time determined based on the configured CSI report setting information.

If the eNB determines that the UE operates in the DRX mode at operation 1520, then the eNB may proceed to operation 1540 at which the eNB may receive at least one CSI report from the UE at a reception time that is determined depending on the configured CSI report setting information and the active time period included in the DRX setting information.

Fourth Embodiment of the Present Disclosure

A fourth embodiment of the present disclosure corresponds to a way to explicitly setting and operating each of CSI report setting information #1 for a UE operating in the non-DRX mode and CSI report setting information #2 for a UE operating in the DRX mode, depending on whether a UE operates in the DRX mode in a mobile communication system supporting CoMP. A method of transmitting and receiving a CSI report according to the fourth embodiment will be described in more detail below with reference to FIGS. 16 and 17.

Figure 16:
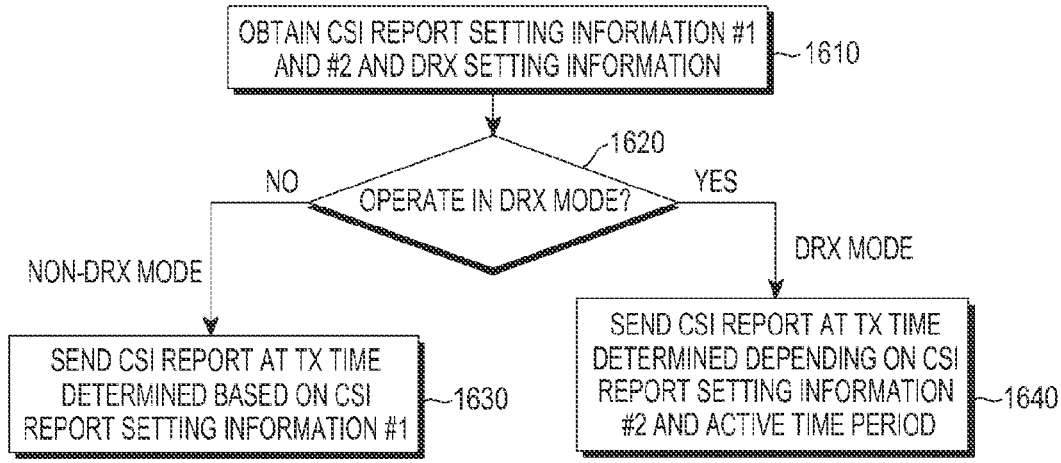
FIG. 16 is a flowchart illustrating a process of sending a CSI report for a DL channel by a UE in a mobile communication system supporting CoMP according to a fourth embodiment of the present disclosure.

FIG. 16 is a flowchart illustrating a process of sending a CSI report for a DL channel by a UE in a mobile communication system supporting CoMP according to a fourth embodiment of the present disclosure.

Referring to FIG. 16, at operation 1610, a UE may obtain CSI report setting information #1 and #2 and DRX setting information from an eNB. The CSI report setting information #1 and #2 may include CSI report transmission cycle $N_{pd,i}$ and transmission time $N_{OFFSET,CQI,i}$ for a CSI process #i, for a UE operating in the non-DRX mode and a UE operating in the DRX mode, respectively. The CSI report setting information #1 and #2 and DRX setting information may be transmitted over a PDSCH, which is a DL physical data channel.

At operation 1620, the UE may determine whether the UE operates in the DRX mode (e.g., by checking an operation mode of the UE).

If the UE determines that the UE does not operate in the DRX mode (e.g., if the UE operates in the non-DRX mode) at operation 1620, then the UE may proceed to operation 1630 at which the UE may send a CSI report for each CSI process to the eNB at a transmission time determined based on the obtained CSI report setting information #1.

In contrast, if the UE determines that the UE operates in the DRX mode at operation 1620, then the UE may proceed to operation 1640 at which the UE may send a CSI report to the eNB at a transmission time that is determined based on the obtained CSI report setting information #2 and the active time period included in the DRX setting information.

The CSI report sent by the UE may be transmitted over a PUCCH which is a UL physical control channel, or a PUSCH which is a UL physical data channel.

Figure 17:
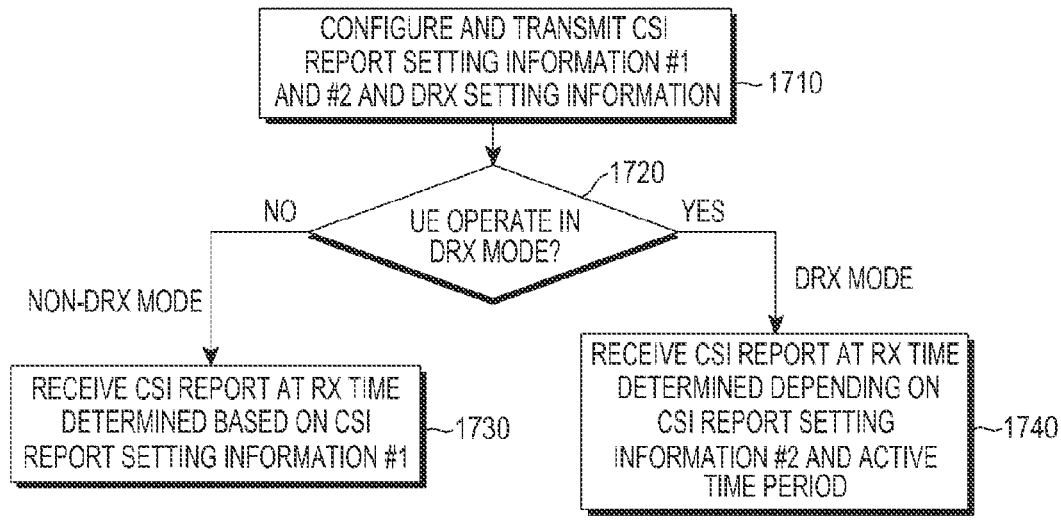
FIG. 17 is a flowchart illustrating a process of receiving a CSI report for a DL channel by an eNB in a mobile communication system supporting CoMP according to the fourth embodiment of the present disclosure.

FIG. 17 is a flowchart illustrating a process of receiving a CSI report for a DL channel by an eNB in a mobile communication system supporting CoMP according to the fourth embodiment of the present disclosure.

Referring to FIG. 17, at operation 1710, an eNB may configure CSI report setting information #1 and #2, and transmit the CSI report setting information #1 and #2 to a UE.

At operation 1720, the eNB may determine whether the UE operates in the DRX mode (e.g., by checking an operation mode of the UE).

If the eNB determines that the UE does not operate in the DRX mode (e.g., if the UE operates in the non-DRX mode) at operation 1720, then the eNB may proceed to operation 1730 at which the eNB may receive a CSI report from the UE at a reception time determined based on the configured CSI report setting information #1.

In contrast, if the eNB determines that the UE operates in the DRX mode at operation 1720, then the eNB may proceed to operation 1740 at which the eNB may receive a CSI report from the UE at a reception time that is determined depending on the configured CSI report setting information #2 and the active time period included in the DRX setting information.

As such, in the CSI report transmission method according to the fourth embodiment of the present disclosure, CSI report setting information #1 for a UE operating in the non-DRX mode and CSI report setting information #2 for a UE operating in the DRX mode may be set and operated, separately.

Figure 18:
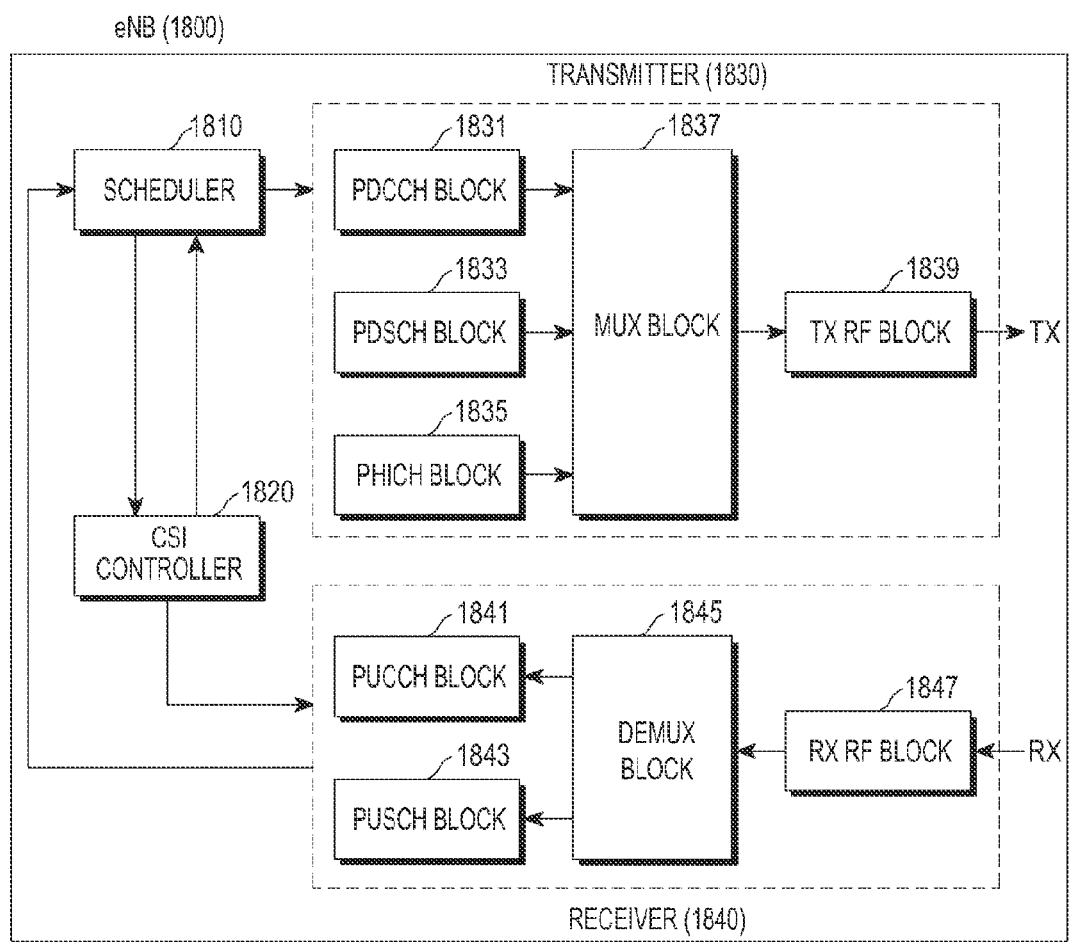
FIG. 18 illustrates a structure of an eNB for receiving a CSI report for a DL channel in a mobile communication system supporting CoMP according to an embodiment of the present disclosure.

FIG. 18 illustrates a structure of an eNB for receiving a CSI report for a DL channel in a mobile communication system supporting CoMP according to an embodiment of the present disclosure.

Referring to FIG. 18, an eNB 1800 may include a scheduler 1810, a CSI controller 1820, a transmitter 1830, and a receiver 1840.

The transmitter 1830 may include a PDCCH block 1831, a PDSCH block 1833, a Physical HARQ (Hybrid Automatic Retransmit reQuest) Indicator Channel (PHICH) block 1835, a Multiplexing (MUX) block 1837, and a transmitting Radio Frequency (RF) block 1839. According to various embodiments of the present disclosure, each of the above-identified blocks may be implemented by hardware or software.

The receiver 1840 may include a PUCCH block 1841, a PUSCH block 1843, a Demultiplexing (DEMUX) block 1845, and a receiving RV block 1847. According to various embodiments of the present disclosure, each of the above-identified blocks may be implemented by hardware or software.

The CSI controller 1820 may receive UE's scheduling and operation mode (DRX mode or non-DRX mode) information from the scheduler 1810, and determine reception-related information (e.g., CSI report reception time, UE's CSI report transmission format, and the like) determined based on the UE's operation mode, to control an operation of the receiver 1840. The CSI controller 1820 may provide the CSI report reception-related information to the scheduler 1810 to support an eNB's scheduling operation. As a modified example, the CSI controller 1820 and the scheduler 1810 may be implemented in a single block.

The PDCCH block 1831, under control of the scheduler 1810, may generate a PDCCH signal by performing a process such as channel coding and modulation on DL control information including scheduling information, and the like. The PDSCH block 1833, under control of the scheduler 1810, may generate a PDSCH signal by performing a process such as channel coding and modulation on DL data. The PHICH block 1835, under control of the scheduler 1810, may generate a PHICH signal by performing a process such as channel coding and modulation on HARQ-Acknowledge (ACK)/Negative Acknowledge (NACK) information for UL data.

The PDCCH signal, the PDSCH signal, and the PHICH signal, which are respectively generated in the PDCCH block 1831, the PDSCH block 1833, and the PHICH block 1835, may be multiplexed by the MUX block 1837, RF-processed in the transmitting RF block 1839, and then transmitted to the UE. The above-described CSI report setting information and DRX setting information may be transmitted through the PDSCH block 1833.

The receiver 1840 may demultiplex the signal (e.g., a CSI report) that is received from the UE through the receiving RF block 1847, by means of the DEMUX block 1845, and distribute the demultiplexed signals to the PUCCH block 1841 and the PUSCH block 1843. The PUCCH block 1841 may obtain information such as CSI report, HARQ-ACK/NACK, and the like by performing a process such as demodulation and channel decoding on a PUCCH including Uplink Control Information (UCI). The PUSCH block 1843 may obtain UL data transmitted by a UE, by performing a process such as demodulation and channel decoding on a PUSCH including UE's UL data or UL control information. The receiver 1840 may apply the output results of the PUCCH block 1841 and the PUSCH block 1843 to the scheduler 1810, to make use of results of the PUCCH block 1841 and the PUSCH block 1843 for a scheduling process.

Figure 19:
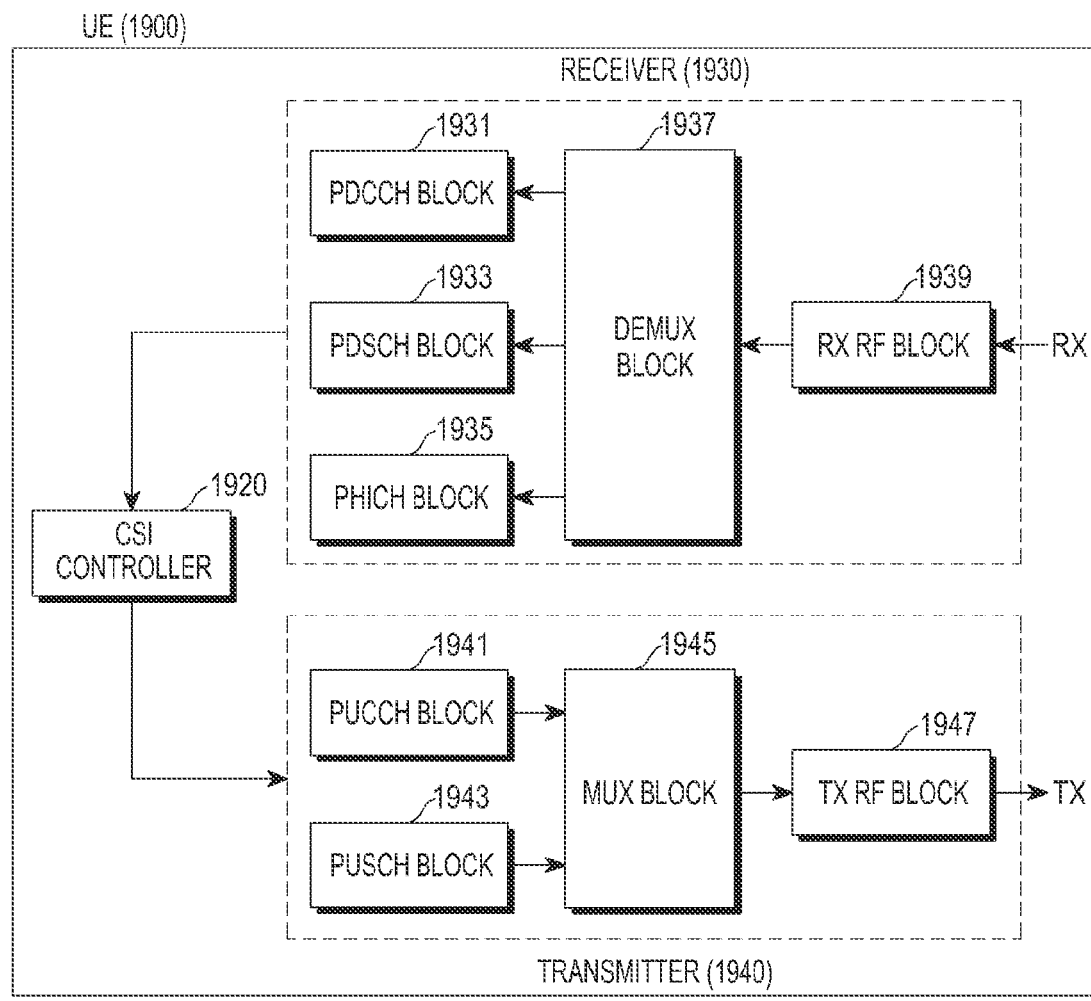
FIG. 19 illustrates a structure of a UE for sending a CSI report for a DL channel in a mobile communication system supporting CoMP according to an embodiment of the present disclosure.

FIG. 19 illustrates a structure of a UE for sending a CSI report for a DL channel in a mobile communication system supporting CoMP according to an embodiment of the present disclosure.

Referring to FIG. 19, a UE 1900 may include a CSI controller 1920, a receiver 1930, and a transmitter 1940.

The receiver 1930 may include a PDCCH block 1931, a PDSCH block 1933, a PHICH block 1935, a DEMUX block 1937, and a receiving RF block 1939. According to various embodiments of the present disclosure, each of the above-identified blocks may be implemented by hardware or software.

The transmitter 1940 may include a PUCCH block 1941, a PUSCH block 1943, a MUX block 1945, and a transmitting RF block 1947. According to various embodiments of the present disclosure, each of the above-identified blocks may be implemented by hardware or software.

The CSI controller 1920 may adjust UE's CSI report transmission time and UE's CSI report transmission format based on the CSI report setting information and DRX setting information obtained from an eNB, and control an operation of the transmitter 1940.

The receiver 1930 may demultiplex the signal that is received from the eNB via the receiving RF block 1939, by means of the DEMUX block 1937, and distribute the demultiplexed signals to the PDCCH block 1931, the PDSCH block 1933, and the PHICH block 1935. The PDCCH block 1931 may obtain DL control information by performing a process such as demodulation and channel decoding on the PDCCH signal received by the UE. The PDSCH block 1933 may obtain DL data by performing a process such as demodulation and channel decoding on the PDSCH signal received by the UE. The PHICH block 1935 may obtain HARQ-ACK/NACK information for the UL data transmitted by the UE by performing a process such as demodulation and channel decoding on the PHICH signal received by the UE. The above-described CSI report setting information and DRX setting information may be received by the UE through the PDSCH block 1933.

The PUCCH block 1941 may generate a PUCCH signal by performing a process such as channel coding and modulation on UL control information including HARQ-ACK/NACK, CSI report, and the like. The PUSCH block 1943 may generate a PUSCH signal by performing a process such as channel coding and modulation on UL data and UL control information. The PUCCH signal generated in the PUCCH block 1941 and the PUSCH signal generated in the PUSCH block 1943 may be multiplexed by means of the MUX block 1945, RF-processed in the transmitting RF block 1947, and then transmitted to the eNB. The CSI report may be sent through the PUCCH block 1941 or the PUSCH block 1943.

It can be appreciated that the channel state information transmission/reception method according to various embodiments of the present disclosure may be implemented by hardware, software or a combination thereof. The software may be stored in a volatile or non-volatile storage (e.g., erasable or re-writable Read Only Memory (ROM)), a memory (e.g., Random Access Memory (RAM), memory chip, memory device or memory Integrated Circuit (IC)), or an optically or magnetically writable machine (or computer)-readable storage medium (e.g., Compact Disk (CD), Digital Versatile Disk (DVD), magnetic disk, or magnetic tape). The channel state information transmission/reception method proposed by the present disclosure may be implemented by a computer or a mobile terminal, which includes a controller and a memory. The memory may be an example of a non-transitory machine-readable storage media (e.g., a non-transitory computer-readable storage medium) suitable to store a program or programs including instructions for implementing various embodiments of the present disclosure.

Various embodiments of the present disclosure may include a program including codes for implementing the apparatus and method defined by the appended claims, and a non-transitory machine (or computer)-readable storage medium storing the program. This program may be electronically transferred via any medium such as communication signals which are transmitted through wired/wireless connections. The present disclosure may include equivalents thereof.

According to various embodiments of the present disclosure, channel state information transmission/reception apparatus may receive and store the program from a program server to which the apparatus is connected by wires or wirelessly. The program server may include a memory for storing a program including instructions for implementing the channel state information transmission/reception method, and information needed for the method, a communication unit for performing wire/wireless communication with the channel state information transmission/reception apparatus, and a controller for transmitting the program to the channel state information transmission/reception apparatus upon request or automatically.

As is apparent from the foregoing description, according to various embodiments of the present disclosure, in a mobile communication system supporting CoMP, a UE operating in the DRX mode may efficiently send a CSI report for a DL channel, thereby making prevention or reduction of unnecessary power consumption of the UE possible and allow an eNB to perform a more efficient scheduling operation.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting a channel state information (CSI) report for a downlink (DL) channel by a user equipment (UE) in a mobile communication system, the method comprising:
   identifying, from an evolved node b (eNB), CSI report setting information including information related to a transmission cycle and a transmission offset for calculating a transmission time of a CSI report, and discontinuous reception (DRX) setting information including information related to an active time period included in a DRX cycle, the DRX cycle including the active time period and a deactive time period;
   determining whether the transmission time of the CSI report is included in the active time period;
   adjusting, if the transmission time of the CSI report is determined not to be included in the active time period, the transmission time of the CSI report to a time which is included in the active time period; and
   transmitting the CSI report at the adjusted transmission time.

2. The method of claim 1, further comprising:
   receiving, from the eNB, information related to a channel having a priority that is higher than a threshold priority; and
   transmitting, at the adjusted transmission time, a CSI report for the channel having priority that is higher than the threshold priority.

3. The method of claim 1, further comprising:
   when the adjusted transmission time overlaps a transmission time of another CSI report, multiplexing and transmitting the CSI report and another CSI report at the adjusted transmission time.

4. The method of claim 1, wherein the CSI report is sent in a subframe satisfying the following equation:

$$(10 \times n_f + \lfloor n_s/2 \rfloor - N_{OFFSET,CQI,i}) \bmod (N_{pd,i}) = 0$$

where $n_f$ denotes a radio frame index, $n_s$ denotes a slot index, 'A mod B' denotes a remainder obtained by dividing A by B, $\lfloor n_s/2 \rfloor$ denotes a floor function of $n_s/2$, and $N_{OFFSET,CQI,i}$ and $N_{pd,i}$ denote a transmission offset and a transmission cycle for a CSI report of a CSI process #i, respectively.

5. The method of claim 1, further comprising:
   when the UE is determined to operate in a non-DRX mode, calculating the transmission time of the CSI report based on the CSI report setting information; and
   transmitting the CSI report at the calculated transmission time.

6. A method for transmitting a channel state information (CSI) report for a downlink (DL) channel by a user equipment (UE) in a mobile communication system, the method comprising:
   identifying, from an evolved node b (eNB), discontinuous reception (DRX) setting information including information related to an active time period included in a DRX cycle, the DRX cycle including the active time period and a deactive time period, first CSI report setting information including information related to a first transmission cycle and a first transmission offset for calculating a first transmission time of a CSI report related to a UE operating in a non-DRX mode, and second CSI report setting information including information related to a second transmission cycle and a second transmission offset for calculating a second transmission time of a CSI report related to a UE operating in a DRX mode;
   determining whether the UE operates in the DRX mode; and
   when the UE is determined to operate in the DRX mode, transmitting the CSI report at the second transmission time, the second transmission time being calculated based on the active time period, the second transmission cycle, and the second transmission offset.

7. The method of claim 6, further comprising:
   when the UE is determined to operate in the non-DRX mode, transmitting the CSI report at the first transmission time calculated based on the first CSI report setting information.

8. The method of claim 6, wherein the CSI report is transmitted in a subframe satisfying the following equation:

$$(10 \times n_f + \lfloor n_s/2 \rfloor - N_{OFFSET,CQI,i}) \bmod (N_{pd,i}) = 0$$

where $n_f$ denotes a radio frame index, $n_s$ denotes a slot index, 'A mod B' denotes a remainder obtained by dividing A by B, $\lfloor n_s/2 \rfloor$ denotes a floor function of $n_s/2$, and $N_{OFFSET,CQI,i}$ and $N_{pd,i}$ denote a transmission offset and a transmission cycle for a CSI report of a CSI process #i, respectively.

9. A method for receiving a channel state information (CSI) report for a downlink (DL) channel by an evolved node b (eNB) in a mobile communication system, the method comprising:
configuring CSI report setting information including information related to a transmission cycle and a transmission offset for calculating a transmission time of a CSI report, and discontinuous reception (DRX) setting information including information related to an active time period included in a DRX cycle, the DRX cycle including the active time period and a deactive time period;
transmitting the CSI report setting information and the DRX setting information to a user equipment (UE);
determining whether a reception time of the CSI report is included in the active time period;
determining, if the reception time of the CSI report is determined not to be included in the active time period, the reception time of the CSI report as a time which is included in the active time period; and
receiving the CSI report at the determined reception time.

10. The method of claim 9, further comprising:
configuring information related to a channel having a priority that is higher than a threshold priority;
transmitting the configured information to the UE; and
receiving, at the determined reception time, a CSI report for the channel having a priority that is higher than the threshold priority.

11. The method of claim 9, further comprising:
receiving, at the determined reception time, CSI reports which are multiplexed and transmitted.

12. The method of claim 9, further comprising:
when the UE is determined to operate in a non-DRX mode, calculating the reception time for the CSI report based on the CSI report setting information; and
receiving the CSI report at the calculated reception time.

13. The method of claim 9, wherein the CSI report is received in a subframe satisfying the following equation;

$$(10 \times n_f + \lfloor n_s/2 \rfloor - N_{OFFSET,CQI,i}) \bmod (N_{pd,i}) = 0$$

where $n_f$ denotes a radio frame index, $n_s$ denotes a slot index, 'A mod B' denotes a remainder obtained by dividing A by B, $\lfloor n_s/2 \rfloor$ denotes a floor function of $n_s/2$, and $N_{OFFSET,CQI,i}$ and $N_{pd,i}$ denote a transmission offset and a transmission cycle for a CSI report of a CSI process #i, respectively.

14. A method for receiving a channel state information (CSI) report for a downlink (DL) channel by an evolved node b (eNB) in a mobile communication system, the method comprising:
configuring discontinuous reception (DRX) setting information including information related to an active time period included in a DRX cycle, the DRX cycle including the active time period and a deactive time period, first CSI report setting information including information related to a first transmission cycle and a first transmission offset for calculating a first transmission time of a CSI report related to a user equipment (UE) operating in a non-DRX mode, and second CSI report setting information including information related to a second transmission cycle and a second transmission offset for calculating a second transmission time of a CSI report related to a UE operating in a DRX mode;
transmitting the DRX setting information, the first CSI report setting information and the second CSI report setting information to the UE;
determining whether the UE operates in the DRX mode; and
when the UE is determined to operate in the DRX mode, receiving the CSI report at a reception time, the reception time being calculated based on the active time period, the second transmission cycle and the second transmission offset.

15. The method of claim 14, further comprising:
when the UE is determined to operate in the non-DRX mode, receiving the CSI report at a reception time calculated based on the first CSI report setting information.

16. The method of claim 14, wherein the CSI report is received in a subframe satisfying the following equation:

$$(10 \times n_f + \lfloor n_s/2 \rfloor - N_{OFFSET,CQI,i}) \bmod (N_{pd,i}) = 0$$

where $n_f$ denotes a radio frame index, $n_s$ denotes a slot index, 'A mod B' denotes a remainder obtained by dividing A by B, $\lfloor n_s/2 \rfloor$ denotes a floor function of $n_s/2$, and $N_{OFFSET,CQI,i}$ and $N_{pd,i}$ denote a transmission offset and a transmission cycle for a CSI report of a CSI process #i, respectively.

17. A user equipment (UE) for transmitting a channel state information (CSI) report for a downlink (DL) channel in a mobile communication system, the UE comprising:
a transceiver configured to transmit and receive data; and
at least one processor configured to:
identify, from an evolved node b (eNB), CSI report setting information including information related to a transmission cycle and a transmission offset for calculating a transmission time of a CSI report, and discontinuous reception (DRX) setting information including information related to an active time period included in a DRX cycle, the DRX cycle including the active time period and deactive time period,
determine whether the transmission time of the CSI report is included in the active time period,
adjust, if the transmission time of the CSI report is determined not to be included in the active time period, the transmission time of the CSI report to a time which is included in the active time period, and
transmit the CSI report at the adjusted transmission time.

18. The UE of claim 17, wherein the at least one processor is further configured to:
receive, from the eNB, information related to a channel having a priority that is higher than a threshold priority, and
transmit, at the adjusted transmission time, a CSI report for the channel having a priority that is higher than the threshold priority.

19. The UE of claim 17, wherein, the at least one processor is further configured to, when the adjusted transmission time overlaps a transmission time of another CSI report, multiplex and transmit the CSI report and another CSI report at the adjusted transmission time.

20. The UE of claim 17, wherein the CSI report is sent in a subframe satisfying the following equation:

$$(10 \times n_f + \lfloor n_s/2 \rfloor - N_{OFFSET,CQI,i}) \bmod (N_{pd,i}) = 0$$

where $n_f$ denotes a radio frame index, $n_s$ denotes a slot index, 'A mod B' denotes a remainder obtained by dividing A by B, $\lfloor n_s/2 \rfloor$ denotes a floor function of $n_s/2$, and $N_{OFFSET,CQI,i}$ and $N_{pd,i}$ denote a transmission offset and a transmission cycle for a CSI report of a CSI process #i, respectively.

21. The UE of claim 17, wherein, the at least one processor is further configured to:
   determine that the UE operates in a non-DRX mode,
   calculate the transmission time of the CSI report based on the CSI report setting information, and
   transmit the CSI report at the calculated transmission time.

22. A user equipment (UE) for transmitting a channel state information (CSI) report for a downlink (DL) channel in a mobile communication system, the UE comprising:
   a transceiver configured to transmit and receive data; and
   at least one processor configured to:
      identify, from an evolved node b (eNB):
         discontinuous reception (DRX) setting information including information related to an active time period included in a DRX cycle, the DRX cycle including the active time period and a deactive time period,
         first CSI report setting information including information related to a first transmission cycle and a first transmission offset for calculating a first transmission time of a CSI report related to a UE operating in a non-DRX mode, and
         second CSI report setting information including information related to a second transmission cycle and a second transmission offset for calculating a second transmission time of a CSI report related to a UE operating in a DRX modes,
      determine whether the UE operates in the DRX mode, and
      transmit, when the UE is determined to operate in the DRX mode, the CSI report at the second transmission time, the second transmission time being calculated based on the active time period, the second transmission cycle, and the second transmission offset.

23. The UE of claim 22, wherein the at least one processor is further configured to, when the UE is determined to operate in the non-DRX mode, transmit the CSI report at the first transmission time calculated based on the first CSI report setting information.

24. The UE of claim 22, wherein the CSI report is transmitted in a subframe satisfying the following equation:

$$(10 \times n_f + \lfloor n_s/2 \rfloor - N_{OFFSET,CQI,i}) \mod (N_{pd,i}) = 0$$

where $n_f$ denotes a radio frame index, $n_s$ denotes a slot index, 'A mod B' denotes a remainder obtained by dividing A by B, $\lfloor n_s/2 \rfloor$ denotes a floor function of $n_s/2$, and $N_{OFFSET,CQI,i}$ and $N_{pd,i}$ denote a transmission offset and a transmission cycle for a CSI report of a CSI process #i, respectively.

25. An evolved node b (eNB) for receiving a channel state information (CSI) report for a downlink (DL) channel in a mobile communication system, the eNB comprising:
   a transceiver configured to transmit and receive data; and
   at least one processor configured to:
      configure CSI report setting information including information related to a transmission cycle and a transmission offset for calculating a transmission time of a CSI report, and discontinuous reception (DRX) setting information including information related to an active time period included in a DRX cycle, the DRX cycle including the active time period and a deactive time period,
      transmit the CSI report setting information and the DRX setting information to a user equipment (UE),
      determine whether a reception time of the CSI report is included in the active time period,
      determine, if the reception time of the CSI report is determined not to be included in the active time period, the reception time of the CSI report as a time which is included in the active time period, and
      receive the CSI report at the determined reception time.

26. The eNB of claim 25, wherein the at least one processor is further configured to:
   configure information related to a channel having a priority that is higher than a threshold priority,
   transmit the configured information to the UE, and
   receive, at the determined reception time, a CSI report for the channel having a priority that is higher than the threshold priority.

27. The eNB of claim 25, wherein the at least one processor is further configured to receive, at the determined reception time, CSI reports which are multiplexed and transmitted.

28. The eNB of claim 25, wherein the at least one processor is further configured to:
   determine that the UE operates in a non-DRX mode,
   calculate a reception time for the CSI report based on the CSI report setting information, and
   receive the CSI report at the calculated reception time.

29. The eNB of claim 25, wherein the CSI report is received in a subframe satisfying the following equation:

$$(10 \times n_f + \lfloor n_s/2 \rfloor - N_{OFFSET,CQI,i}) \mod (N_{pd,i}) = 0$$

where $n_f$ denotes a radio frame index, $n_s$ denotes a slot index, 'A mod B' denotes a remainder obtained by dividing A by B, $\lfloor n_s/2 \rfloor$ denotes a floor function of $n_s/2$, and $N_{OFFSET,CQI,i}$ and $N_{pd,i}$ denote a transmission offset and a transmission cycle for a CSI report of a CSI process #i, respectively.

30. An evolved node b (eNB) for receiving a channel state information (CSI) report for a downlink (DL) channel in a mobile communication system, the eNB comprising:
   a transceiver configured to transmit and receive data; and
   at least one processor configured to:
      configure discontinuous reception (DRX) setting information including information related to an active time period included in a DRX cycle, the DRX cycle including the active time period and a deactive time period, first CSI report setting information including information related to a first transmission cycle and a first transmission offset for calculating a first transmission time of a CSI report related to a user equipment (UE) operating in a non-DRX mode,
      configure second CSI report setting information including information related to a second transmission cycle and a second transmission offset for calculating a second transmission time of a CSI report related to a UE operating in a DRX mode,
      transmit the DRX setting information, the first CSI report setting information and the second CSI report setting information to the UE,
      determine whether the UE operates in the DRX mode, and
      receive, when the receiver determines that the UE operates in the DRX mode, the CSI report at a reception time, the reception time being calculated based on the active time period, the second transmission cycle and the second transmission offset.

31. The eNB of claim 30, wherein the at least one processor is further configured to, when the UE operates in the non-DRX mode, receive the CSI report at a reception time calculated based on the first CSI report setting information.

32. The eNB of claim 30, wherein the CSI report is received in a subframe satisfying the following equation:

$$(10 \times n_f + \lfloor n_s/2 \rfloor - N_{OFFSET,CQI,i}) \bmod (N_{pd,i}) = 0$$

where $n_f$ denotes a radio frame index, $n_s$ denotes a slot index, 'A mod B' denotes a remainder obtained by dividing A by B, $\lfloor n_s/2 \rfloor$ denotes a floor function of $n_s/2$, and $N_{OFFSET,CQI,i}$ and $N_{pd,i}$ denote a transmission offset and a transmission cycle for a CSI report of a CSI process #i, respectively.

* * * * *